US012804262B2

(12) United States Patent
Lin et al.

(10) Patent No.: US 12,804,262 B2
(45) Date of Patent: Nov. 17, 2026

(54) FOCUSING METHOD AND ELECTRONIC DEVICE

(71) Applicant: Honor Device Co., Ltd., Shenzhen (CN)

(72) Inventors: Mengran Lin, Shenzhen (CN); Hanyu Feng, Shenzhen (CN); Congchao Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/178,521

(22) Filed: Apr. 14, 2025

(65) Prior Publication Data

US 2026/0143231 A1 May 21, 2026

Related U.S. Application Data

(63) Continuation of application No. 18/266,987, filed as application No. PCT/CN2022/073333 on Jan. 22, 2022, now Pat. No. 12,301,988.

(30) Foreign Application Priority Data

Jun. 29, 2021 (CN) ........................ 202110735216.2

(51) Int. Cl.

*H04N 23/67* (2023.01)
*H04N 23/611* (2023.01)
(Continued)

(52) U.S. Cl.

CPC ......... *H04N 23/673* (2023.01); *H04N 23/611* (2023.01); *H04N 23/62* (2023.01); *H04N 23/632* (2023.01)

(58) Field of Classification Search

CPC ............... H04N 23/673; H04N 23/611; H04N 23/6812; H04N 23/635; H04N 23/687; H04N 23/62; H04N 23/632; H04N 23/631
(Continued)

(56) References Cited

U.S. PATENT DOCUMENTS 7,693,301 B2 4/2010 Li
7,860,387 B2 12/2010 Ishikawa
(Continued)

FOREIGN PATENT DOCUMENTS

CN 101339347 A 1/2009
CN 101340521 A 1/2009
(Continued)

*Primary Examiner* — Pritham D Prabhakher
(74) *Attorney, Agent, or Firm* — Slater Matsil, LLP

(57) ABSTRACT

Embodiments of this application disclose a focusing method and an electronic device, including: In response to a first operation, an electronic device starts photographing, and displays a first interface. The electronic device displays a $K^{th}$ frame of preview image in the first interface at a first moment. The $K^{th}$ frame of preview image is collected by the camera by using a face of a first target as a first focusing frame, and the face of the first target meets a preset facial recognition condition in the $K^{th}$ frame of preview image. The electronic device displays an $M^{th}$ frame of preview image in the first interface at a second moment. The $M^{th}$ frame of preview image is obtained by the camera by focusing on the first focusing frame, the face of the first target does not meet the preset facial recognition condition in the $M^{th}$ frame of preview image.

20 Claims, 36 Drawing Sheets

(51) Int. Cl.
*H04N 23/62* (2023.01)
*H04N 23/63* (2023.01)

(58) Field of Classification Search
USPC .......................................................... 348/345
See application file for complete search history.

(56) References Cited

U.S. PATENT DOCUMENTS

| | | | | |
|---|---|---|---|---|
| 8,130,243 | B2 | 3/2012 | Sudo et al. | |
| 8,279,323 | B2 | 10/2012 | Ishii et al. | |
| 8,396,262 | B2 * | 3/2013 | Aisaka | G06V 40/167 348/169 |
| 8,643,739 | B2 * | 2/2014 | Sagawa | G06F 18/41 382/214 |
| 8,705,813 | B2 * | 4/2014 | Matsuyama | G06V 40/171 348/169 |
| 8,823,857 | B2 * | 9/2014 | Kazama | H04N 23/69 348/333.05 |
| 8,964,099 | B2 | 2/2015 | Sasaki | |
| 9,148,557 | B2 | 9/2015 | Yasuda | |
| 9,215,375 | B2 * | 12/2015 | Shintani | H04N 23/61 |
| 10,148,866 | B2 | 12/2018 | Miyazawa | |
| 10,154,186 | B2 * | 12/2018 | Kang | H04N 23/62 |
| 10,306,131 | B2 | 5/2019 | Yokozeki et al. | |
| 10,491,804 | B2 | 11/2019 | Du et al. | |
| 10,924,680 | B2 * | 2/2021 | Ogawa | H04N 23/62 |
| 11,025,815 | B2 * | 6/2021 | Fleizach | H04N 23/632 |
| 11,233,941 | B2 * | 1/2022 | Ogawa | H04N 23/675 |
| 11,375,120 | B2 | 6/2022 | Wang et al. | |
| 11,831,977 | B2 | 11/2023 | Cui | |
| 2008/0089560 | A1 | 4/2008 | Li et al. | |
| 2008/0247611 | A1 * | 10/2008 | Aisaka | G06F 18/28 382/118 |
| 2009/0009531 | A1 | 1/2009 | Sudo | |
| 2009/0009653 | A1 | 1/2009 | Tsai | |
| 2009/0322933 | A1 | 12/2009 | Ishii | |
| 2010/0040356 | A1 | 2/2010 | Ishikawa | |
| 2012/0013786 | A1 * | 1/2012 | Yasuda | H04N 23/635 348/349 |
| 2012/0268641 | A1 | 10/2012 | Kazama | |
| 2013/0314579 | A1 | 11/2013 | Sasaki | |
| 2014/0176784 | A1 * | 6/2014 | Hongu | H04N 23/61 348/349 |
| 2014/0267803 | A1 | 9/2014 | Shintani | |
| 2016/0295100 | A1 | 10/2016 | Yokozeki | |
| 2017/0013179 | A1 | 1/2017 | Kang | |
| 2017/0289439 | A1 | 10/2017 | Miyazawa | |
| 2019/0082101 | A1 | 3/2019 | Baldwin | |
| 2019/0208131 | A1 | 7/2019 | Du | |
| 2021/0168300 | A1 | 6/2021 | Wang | |
| 2022/0394190 | A1 | 12/2022 | Cui et al. | |
| 2023/0262322 | A1 | 8/2023 | Hou | |

FOREIGN PATENT DOCUMENTS

| | | | |
|---|---|---|---|
| CN | 101620360 | A | 1/2010 |
| CN | 101873427 | A | 10/2010 |
| CN | 102025910 | A | 4/2011 |
| CN | 104363376 | A | 2/2015 |
| CN | 104902161 | A | 9/2015 |
| CN | 104967774 | A | 10/2015 |
| CN | 106385542 | A | 2/2017 |
| CN | 110062166 | A | 7/2019 |
| CN | 110650288 | A | 1/2020 |
| CN | 107439005 | B | 4/2020 |
| CN | 111010506 | A | 4/2020 |
| CN | 112135060 | A | 12/2020 |
| CN | 112333380 | A | 2/2021 |
| CN | 113037990 | A | 6/2021 |
| CN | 113556466 | A | 10/2021 |
| JP | 2008003335 | A | 1/2008 |
| JP | 2011110072 | A | 6/2011 |
| JP | 2012238016 | A | 12/2012 |
| WO | 2016098362 | A1 | 6/2016 |
| WO | 2017166076 | A1 | 10/2017 |

* cited by examiner

CONT. FROM FIG. 1(C)

CONT. FROM FIG. 2(B)

CONT. FROM FIG. 3(A)

FIG. 4(C)
1X
Night
Portrait
Photo
Short video
Video
More

CONT. FROM FIG. 4(B)

(B)

(A)

CONT. FROM FIG. 7(A)

CONT. FROM FIG. 7(C)

CONT. FROM FIG. 8(A)

CONT. FROM FIG. 8(C)

TO FIG. 9(B)

CONT. FROM FIG. 9(A)

CONT. FROM FIG. 10(A)

TO FIG. 10(C)

CONT. FROM FIG. 10(B)

TO FIG. 10(D)

CONT. FROM FIG. 10(C)

1: A target is detected in a first focusing frame in one frame of framed image
0: The target is not detected in the first focusing frame in one frame of framed image

FOCUSING METHOD AND ELECTRONIC DEVICE

CROSS-REFERENCE TO RELATED APPLICATIONS

This application is a continuation of U.S. application Ser. No. 18/266,987, filed on Jun. 13, 2023, which is a national stage of International Application No. PCT/CN2022/073333, filed on Jan. 22, 2022, which claims priority to Chinese Patent Application No. 202110735216.2, filed on Jun. 29, 2021. All of the aforementioned applications are incorporated herein by reference in their entireties.

TECHNICAL FIELD

This solution relates to the field of electronic technologies, and in particular, to a focusing (automatic focus, AF) method and an electronic device.

BACKGROUND

Currently, a camera application is one of important applications on an electronic device, for example, a mobile phone or a tablet computer. A user may record and share a picture and a video by using the camera application on the electronic device. Currently, the user imposes a higher requirement on photographing experience.

Currently, when the user performs photographing, the electronic device may focus on a to-be-photographed object in an image. As the to-be-photographed object changes, a focusing frame also changes, to adapt to a change of the to-be-photographed object, to form a clear image. For example, when a face is displayed in an image of a camera, the electronic device may recognize the face and automatically focus on the face in the image. When the face in the image of the camera suddenly disappears or changes, the electronic device may adjust a focusing frame to a central location of the image.

However, when the focusing frame needs to be adjusted frequently, the focusing frame changes unstably in a preview image. Consequently, the user has poor photographing experience.

SUMMARY

Embodiments of this application disclose a focusing method and an electronic device, to improve stability of a focusing image.

According to a first aspect, an embodiment of this application discloses a focusing method, including: In response to a first operation, an electronic device starts photographing, and displays a first interface. The first interface displays a preview image collected by a camera. The electronic device displays a $K^{th}$ frame of preview image in the first interface at a first moment. The $K^{th}$ frame of preview image is collected by the camera by using a face of a first target as a first focusing frame, and the face of the first target meets a preset facial recognition condition in the $K^{th}$ frame of preview image. The electronic device displays an $M^{th}$ frame of preview image in the first interface at a second moment. The $M^{th}$ frame of preview image is obtained by the camera by focusing on the first focusing frame, the face of the first target does not meet the preset facial recognition condition in the $M^{th}$ frame of preview image, the second moment is after the first moment, a quantity of frames of images between the $M^{th}$ frame of preview image and the $K^{th}$ frame of preview image is less than or equal to a preset threshold A, and K, M, and A each are a positive integer.

A process of determining whether the face of the first target meets the preset facial recognition condition may be referred to as a process of determining a target bounding box. The target bounding box may be a face bounding box. The first operation is an operation that a user starts a camera application. For a value of A, refer to descriptions in S101.

In this embodiment of this application, when the face of the first target does not meet the preset facial recognition condition, an exit from a focusing frame can be delayed, to reduce a quantity of times that a focused target in the preview image frequently changes, and reduce a quantity of changes between a clear image and an unclear image of a target that are presented in a viewfinder frame, so that stability of a focusing image can be improved, and user experience can be improved.

In a possible implementation, the preset facial recognition condition includes that a face bounding box of the first target is greater than a first threshold, and/or that a center of the face bounding box is located in an edge range of the preview image, and the edge range is a predetermined range of an edge of the preview image. In this way, accuracy of determining a face in the preview image by the electronic device can be improved, and user experience can be improved.

For a method for determining whether the preset facial recognition condition is met, specifically refer to a method for determining whether a face exists in the viewfinder frame, that is, a method for determining, based on a size and/or a location of the target bounding box, whether a target can be detected.

In a possible implementation, the method further includes: The electronic device displays a $W^{th}$ frame of preview image in the first interface at a third moment. The $W^{th}$ frame of preview image is collected by the camera by focusing on a central focusing frame, the face of the first target does not meet the preset facial recognition condition in the $W^{th}$ frame of preview image, the third moment is after the first moment, the face of the first target does not meet the preset facial recognition condition in each preview image between the $W^{th}$ frame of preview image and the $K^{th}$ frame of preview image, a quantity of frames of images between the $W^{th}$ frame of preview image and the $K^{th}$ frame of preview image is greater than the preset threshold A, and W is a positive integer.

In a possible implementation, that the electronic device displays a $W^{th}$ frame of preview image in the first interface specifically includes: The electronic device detects, at the third moment, A frames of preview images before the third moment. When no face in the consecutive A frames of preview images meets the preset facial recognition, the electronic device determines a target location based on the central focusing frame, adjusts a focal length of the camera by using a motor, and collects the $W^{th}$ frame of preview image by using the camera. The target location is a motor location of the central focusing frame. The electronic device displays the $W^{th}$ frame of preview image.

In a possible implementation, that the electronic device determines a target location based on the central focusing frame, adjusts a focal length of the camera by using a motor, and collects the $W^{th}$ frame of preview image by using the camera specifically includes: when a distance between the target location and a current motor location is greater than a second threshold, adjusting the focal length of the camera for a plurality of times by using the motor, and collecting the $W^{th}$ preview image by using the camera. In this way, when the electronic device needs to adjust a focus, and a focusing distance is too large, the focus can be adjusted for a plurality of times, and a location of a focusing frame in the preview image is smoothly moved, to improve user experience.

In a possible implementation, that the electronic device determines a target location based on the central focusing frame, adjusts a focal length of the camera by using a motor, and collects the $W^{th}$ frame of preview image by using the camera specifically includes: when a distance between the target location and a current motor location is not greater than a second threshold, adjusting the focal length of the camera for one time by using the motor, and collecting the $W^{th}$ preview image by using the camera.

In a possible implementation, the method further includes: The electronic device displays an $S^{th}$ frame of preview image in the first interface at a fourth moment. The $S^{th}$ frame of preview image is collected by the camera by focusing on the first focusing frame, the face of the first target does not meet the preset facial recognition condition in the $S^{th}$ frame of preview image, the fourth moment is after the first moment, consecutive B frames of preview images before the $K^{th}$ frame of preview image all meet the preset facial recognition condition, the face of the first target does not meet the preset facial recognition condition in each preview image between the $S^{th}$ frame of preview image and the $K^{th}$ frame of preview image, a quantity of frames of images between the $S^{th}$ frame of preview image and the $K^{th}$ frame of preview image is less than or equal to a preset threshold A+C, and S, B, and C each are a positive integer. In this way, when no face of the first target in the consecutive A frames of preview images meets the preset facial recognition condition, the electronic device can determine whether consecutive B frames of preview images before the A frames all meet the preset facial recognition condition. When the consecutive B frames of preview images before the A frames all meet the preset facial recognition condition, the electronic device may continue to focus on the first focusing frame; and when not all of the consecutive B frames of preview images before the A frames meet the preset facial recognition condition, the electronic device returns to a central defocusing frame. In this way, a quantity of times that a focused target in the preview image frequently changes can be further reduced, to reduce a quantity of changes between a clear image and an unclear image of a target that are presented in a viewfinder frame, so that user experience can be improved.

In a possible implementation, the method further includes: That the electronic device displays a $K^{th}$ frame of preview image in the first interface includes: The electronic device displays the $K^{th}$ preview image in the first interface at a fifth moment when a face attitude angle yaw is greater than a first angle, where a ratio of a height to a width of the first focusing frame in the $K^{th}$ preview image is less than a ratio of a height to a width of a focusing frame in a previous preview image, and the face attitude angle yaw is an angle at which the head of a person rotates upwards and downwards; and the electronic device displays the $K^{th}$ preview image in the first interface at a sixth moment when a face attitude angle pitch is greater than a second angle, where a ratio of a height to a width of the first focusing frame in the $K^{th}$ preview image is greater than a ratio of a height to a width of a focusing frame in a previous preview image, and the face attitude angle pitch is an angle at which the head of the person rotates leftwards and rightwards. In this way, when a face in the first focusing frame meets the preset facial recognition condition, an aspect ratio of the first focusing frame can be adjusted based on a rotation situation of the face, to improve focusing accuracy.

For the face attitude angles yaw and/or pitch, the first angle, and the second angle, refer to descriptions in FIG. 17.

According to a second aspect, an embodiment of this application discloses an electronic device, including a touchscreen, a camera, one or more processors, and one or more memories. The one or more memories are configured to store computer program code, the computer program code includes computer instructions, and when the one or more processors execute the computer instructions, the electronic device is enabled to perform the following operations: in response to a first operation, starting photographing, and displaying a first interface, where the first interface displays a preview image collected by a camera; displaying a $K^{th}$ frame of preview image in the first interface at a first moment, where the $K^{th}$ frame of preview image is collected by the camera by using a face of a first target as a first focusing frame, and the face of the first target meets a preset facial recognition condition in the $K^{th}$ frame of preview image; and displaying an $M^{th}$ frame of preview image in the first interface at a second moment, where the $M^{th}$ frame of preview image is obtained by the camera by focusing on the first focusing frame, the face of the first target does not meet the preset facial recognition condition in the $M^{th}$ frame of preview image, the second moment is after the first moment, a quantity of frames of images between the $M^{th}$ frame of preview image and the $K^{th}$ frame of preview image is less than or equal to a preset threshold A, and K, M, and A each are a positive integer.

A process of determining whether the face of the first target meets the preset facial recognition condition may be referred to as a process of determining a target bounding box. The target bounding box may be a face bounding box. The first operation is an operation that a user starts a camera application. For a value of A, refer to descriptions in S101.

In this embodiment of this application, when the face of the first target does not meet the preset facial recognition condition, an exit from a focusing frame can be delayed, to reduce a quantity of times that a focused target in the preview image frequently changes, and reduce a quantity of changes between a clear image and an unclear image of a target that are presented in a viewfinder frame, so that stability of a focusing image can be improved, and user experience can be improved.

In a possible implementation, the preset facial recognition condition includes that a face bounding box of the first target is greater than a first threshold, and/or that a center of the face bounding box is located in an edge range of the preview image, and the edge range is a predetermined range of an edge of the preview image. In this way, accuracy of determining a face in the preview image by the electronic device can be improved, and user experience can be improved.

For a method for determining whether the preset facial recognition condition is met, specifically refer to a method for determining whether a face exists in the viewfinder frame, that is, a method for determining, based on a size and/or a location of the target bounding box, whether a target can be detected.

In a possible implementation, the electronic device further performs the following operation: displaying a $W^{th}$ frame of preview image in the first interface at a third moment. The $W^{th}$ frame of preview image is collected by the camera by focusing on a central focusing frame, the face of the first target does not meet the preset facial recognition condition in the $W^{th}$ frame of preview image, the third moment is after the first moment, the face of the first target does not meet the preset facial recognition condition in each preview image between the $W^{th}$ frame of preview image and the $K^{th}$ frame of preview image, a quantity of frames of images between the $W^{th}$ frame of preview image and the $K^{th}$ frame of preview image is greater than the preset threshold A, and W is a positive integer.

In a possible implementation, when displaying the $W^{th}$ frame of preview image in the first interface, the electronic device specifically performs the following operations: detecting, at the third moment, A frames of preview images before the third moment; when no face in the consecutive A frames of preview images meets the preset facial recognition, determining a target location based on the central focusing frame, adjusting a focal length of the camera by using a motor, and collecting the $W^{th}$ frame of preview image by using the camera, where the target location is a motor location of the central focusing frame; and displaying the $W^{th}$ frame of preview image.

In a possible implementation, when determining the target location based on the central focusing frame, adjusting the focal length of the camera by using a motor, and collecting the $W^{th}$ frame of preview image by using the camera, the electronic device specifically performs the following operations: when a distance between the target location and a current motor location is greater than a second threshold, adjusting the focal length of the camera for a plurality of times by using the motor, and collecting the $W^{th}$ preview image by using the camera. In this way, when the electronic device needs to adjust a focus, and a focusing distance is too large, the focus can be adjusted for a plurality of times, and a location of a focusing frame in the preview image is smoothly moved, to improve user experience.

In a possible implementation, when determining the target location based on the central focusing frame, adjusting the focal length of the camera by using the motor, and collecting the $W^{th}$ frame of preview image by using the camera, the electronic device specifically performs the following operations: when a distance between the target location and a current motor location is not greater than a second threshold, adjusting the focal length of the camera for one time by using the motor, and collecting the $W^{th}$ preview image by using the camera.

In a possible implementation, the electronic device further performs the following operation: displaying an $S^{th}$ frame of preview image in the first interface at a fourth moment. The $S^{th}$ frame of preview image is collected by the camera by focusing on the first focusing frame, the face of the first target does not meet the preset facial recognition condition in the $S^{th}$ frame of preview image, the fourth moment is after the first moment, consecutive B frames of preview images before the $K^{th}$ frame of preview image all meet the preset facial recognition condition, the face of the first target does not meet the preset facial recognition condition in each preview image between the $S^{th}$ frame of preview image and the $K^{th}$ frame of preview image, a quantity of frames of images between the $S^{th}$ frame of preview image and the $K^{th}$ frame of preview image is less than or equal to a preset threshold A+C, and S, B, and C each are a positive integer. In this way, when no face of the first target in the consecutive A frames of preview images meets the preset facial recognition condition, the electronic device can determine whether consecutive B frames of preview images before the A frames all meet the preset facial recognition condition. When the consecutive B frames of preview images before the A frames all meet the preset facial recognition condition, the electronic device may continue to focus on the first focusing frame; and when not all of the consecutive B frames of preview images before the A frames meet the preset facial recognition condition, the electronic device returns to a central defocusing frame. In this way, a quantity of times that a focused target in the preview image frequently changes can be further reduced, to reduce a quantity of changes between a clear image and an unclear image of a target that are presented in a viewfinder frame, so that user experience can be improved.

In a possible implementation, when displaying the $K^{th}$ frame of preview image in the first interface, the electronic device specifically performs the following operations: displaying the $K^{th}$ preview image in the first interface at a fifth moment when a face attitude angle yaw is greater than a first angle, where a ratio of a height to a width of the first focusing frame in the $K^{th}$ preview image is less than a ratio of a height to a width of a focusing frame in a previous preview image, and the face attitude angle yaw is an angle at which the head of a person rotates upwards and downwards; and displaying the $K^{th}$ preview image in the first interface at a sixth moment when a face attitude angle pitch is greater than a second angle, where a ratio of a height to a width of the first focusing frame in the $K^{th}$ preview image is greater than a ratio of a height to a width of a focusing frame in a previous preview image, and the face attitude angle pitch is an angle at which the head of the person rotates leftwards and rightwards. In this way, when a face in the first focusing frame meets the preset facial recognition condition, an aspect ratio of the first focusing frame can be adjusted based on a rotation situation of the face, to improve focusing accuracy.

For the face attitude angles yaw and/or pitch, the first angle, and the second angle, refer to descriptions in FIG. 17.

According to a third aspect, this application provides an electronic device, including a touchscreen, a camera, one or more processors, and one or more memories. The one or more processors are coupled to the touchscreen, the camera, and the one or more memories, the one or more memories are configured to store computer program code, and the computer program code includes computer instructions. When the one or more processors execute the computer instructions, the electronic device is enabled to perform the focusing method in any possible implementation of any one of the foregoing aspects.

According to a fourth aspect, this application provides an electronic device, including one or more functional modules. The one or more functional modules are configured to perform the focusing method in any possible implementation of any one of the foregoing aspects.

According to a fifth aspect, an embodiment of this application provides a computer storage medium, including computer instructions. When the computer instructions are run on an electronic device, a computer apparatus is enabled to perform the focusing method in any possible implementation of any one of the foregoing aspects.

According to a sixth aspect, an embodiment of this application provides a computer program product. When the computer program product is run on a computer, the computer is enabled to perform the focusing method in any possible implementation of any one of the foregoing aspects.

BRIEF DESCRIPTION OF DRAWINGS

The following describes the accompanying drawings used in embodiments of this application.

DESCRIPTION OF EMBODIMENTS

Figure 1A:
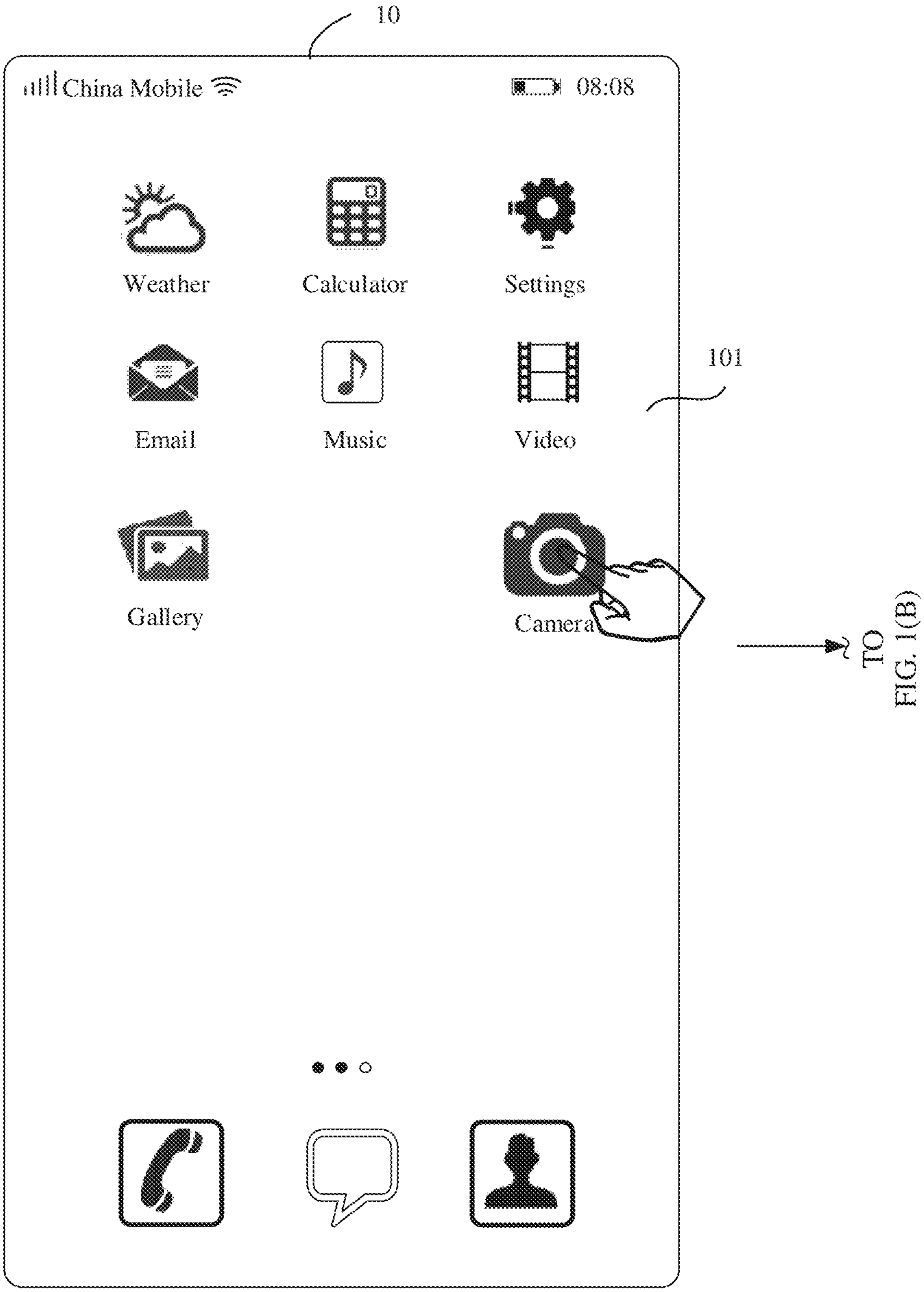
FIG. 1(A), FIG. 1(B), FIG. 1(C), and FIG. 1(D) are a schematic diagram of a group of focusing preview interfaces according to an embodiment of this application.

Terms used in the following embodiments of this application are merely intended to describe specific embodiments, but are not intended to limit embodiments of this application. As used in this specification and the appended claims of embodiments of this application, singular expressions “one”, “one type of”, “the”, “the foregoing”, “this”, or “such a” are also intended to include a plural expression, unless otherwise specified in the context clearly. It should be further understood that the term “and/or” used in embodiments of this application indicates and includes any or all possible combinations of one or more listed items.

Embodiments of this application provide a focusing method and an electronic device. An exit from focusing may be delayed based on a location and/or a size of a focusing frame in a preview image. When a location of the focusing frame needs to be moved, whether to move the focusing frame for a plurality of times or to move the focusing frame for one time may be selected based on a distance the focusing frame needs to move. When a size of a face focusing frame needs to be adjusted, a length of the focusing frame in a corresponding direction may be adjusted based on a rotation attitude angle of a head.

In the focusing method, the electronic apparatus may determine, based on the location and/or the size of the focusing frame in the preview image, whether to delay the exit from focusing, to improve focusing stability.

Some related concepts in embodiments of this application are described below.

(1) Focusing

Focusing is a process in which a camera adjusts an object distance and a focal length, to form a clear image of a to-be-photographed object. An electronic device obtains a highest picture frequency component by adjusting a location of a focusing lens, to obtain higher picture contrast. Focusing is an accumulation process. The electronic device compares contrast of a picture captured by the lens at different locations, to obtain a location at which the lens is located when the contrast of the picture is highest, and further determine the focal length of focusing.

In a photographing process of the electronic device, components such as a lens, a motor, a motor driver chip, and an image sensor (sensor) of a camera module are mainly used during focusing. The lens (lens) is configured to receive light, and the electronic device may include one or more lenses. The lens usually may include one or several transmissive optical elements. The image sensor may convert light passing through the lens into an electrical signal, and then convert the electrical signal into a digital signal. The motor is configured to push an optical element, to adjust the location. A motor driver is configured to determine, during automatic focusing, a location to which the motor pushes the lens.

The lens and a photosensitive chip are main components for imaging, and the motor and the motor driver chip are main components for focusing. When an object is separately in a distant view and a close view, corresponding imaging locations are different. A distance between the lens and the photosensitive chip needs to be adjusted, so that a clear imaging effect can always be obtained on the photosensitive chip. For the camera module of the electronic device, the electronic device needs to push the lens by using the motor, so that the distance (focal length) between the lens and the photosensitive chip and a distance (object distance) between the lens and the to-be-photographed object change.

(2) Focusing Type

There may be three common focusing types: phase detection auto focus (phase detection auto focus, PDAF), contrast detection auto focus (contrast detection auto focus, CDAF), and laser detection auto focus (laser detection auto focus, LDAF).

Phase detection auto focus is a focusing method in which a pair of pixels on a left side and a right side in an image sensor are separately used to detect an amount of light entering an object in a scene, correlation values of the left side and the right side are compared to find a focusing point, and a motor of an optical element is pushed to a corresponding location.

Contrast detection auto focus, also referred to as contrast detection auto focus, is a focusing process in which the optical element is moved to form a clearest image in a focusing area. When a camera is aimed at a to-be-photographed object, the motor pushes the optical element from the bottom to the top. In this process, an image sensor records a contrast value, for example, contrast, and finds a location at which the contrast is highest. The motor pushes, to the location at which the contrast is highest, the optical element moving to the top, to complete final focusing. Contrast detection auto focus may be understood as completing recording of contrast of all image information and then pushing the motor.

During laser detection auto focus, low-power laser light is transmitted to the to-be-photographed object by using an infrared laser sensor near the camera, and is received by the sensor after being reflected, and a distance between the infrared laser sensor and the to-be-photographed object is calculated. Then, a motor between lenses directly pushes the optical element to a corresponding location, to complete focusing.

First, an embodiment of this application describes a focusing method with reference to the accompanying drawings. According to the method, an electronic device may focus on a target during photographing. The target may include a face, an animal, an object, or the like. A user does not need to tap a screen to focus, and the electronic device can determine the target and automatically adjust a focusing frame. The electronic device does not need to be operated by the user, to improve user experience.

FIG. 1(A), FIG. 1(B), FIG. 1(C), and FIG. 1(D) are a schematic diagram of a group of focusing preview interfaces. As shown in FIG. 1(A), an electronic device may have a page 10 on which an application icon is placed. The page includes a plurality of application icons 101 (for example, a Weather application icon, a Calculator application icon, a Settings application icon, an Email application icon, a Music application icon, a Video application icon, a Gallery application icon, and a Camera application icon). A page indicator may be further displayed below the plurality of application icons, to indicate a location relationship between a currently displayed page and another page. A plurality of tray icons (for example, a Phone application icon, a Messaging application icon, and a Contacts application icon) exist below the page indicator, and the tray icon remains displayed during page switching. In some embodiments, the page may also include a plurality of application icons and a page indicator. The page indicator may not be a part of the page, and may exist separately. The picture icon is also optional. This is not limited in this application.

Figure 1B:
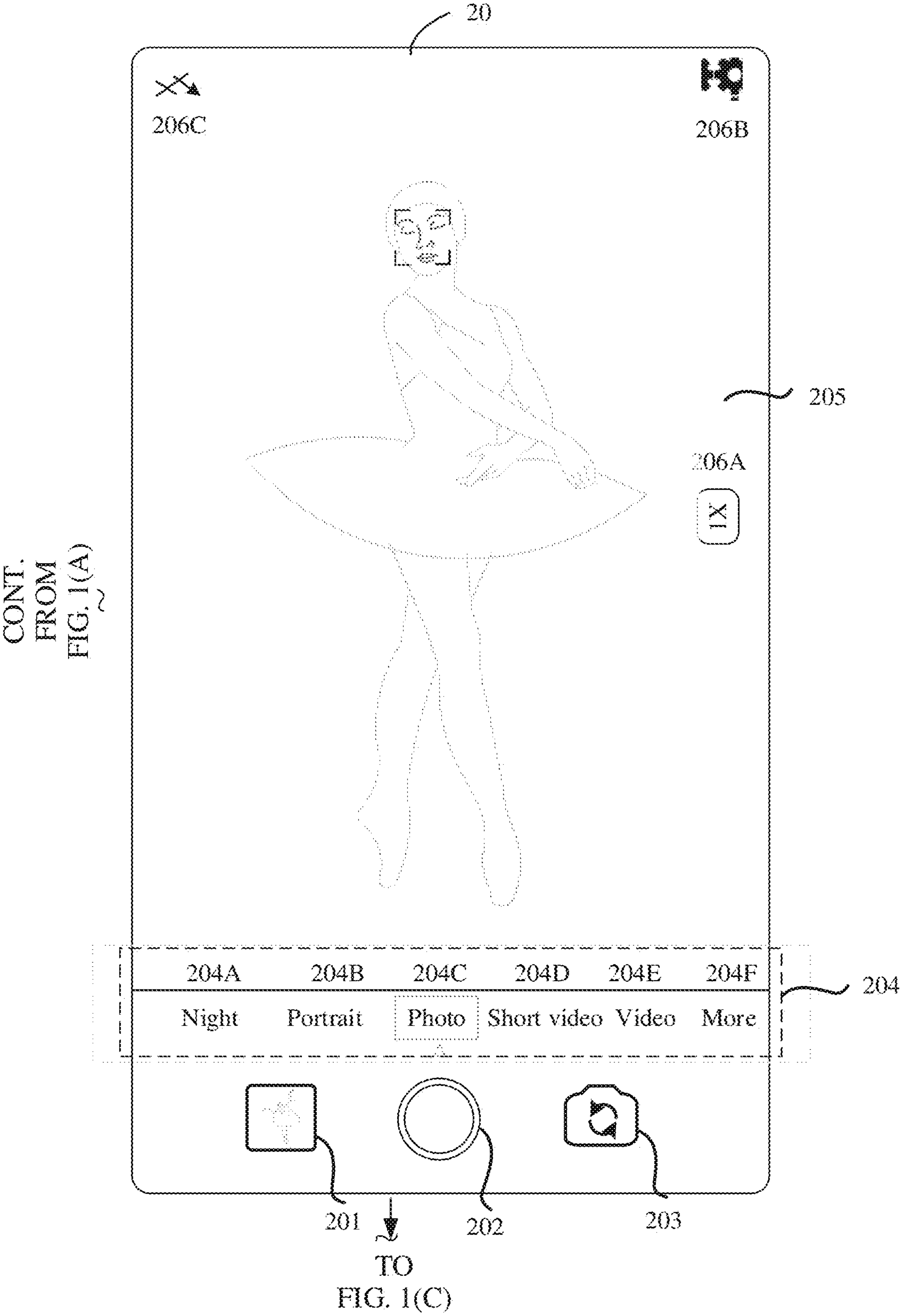

The electronic device 100 may receive an input operation (for example, a tap) performed by a user on the Camera application icon, and in response to the input operation, the electronic device 100 may display a photographing interface 20 as shown in FIG. 1(B).

Figure 1C:
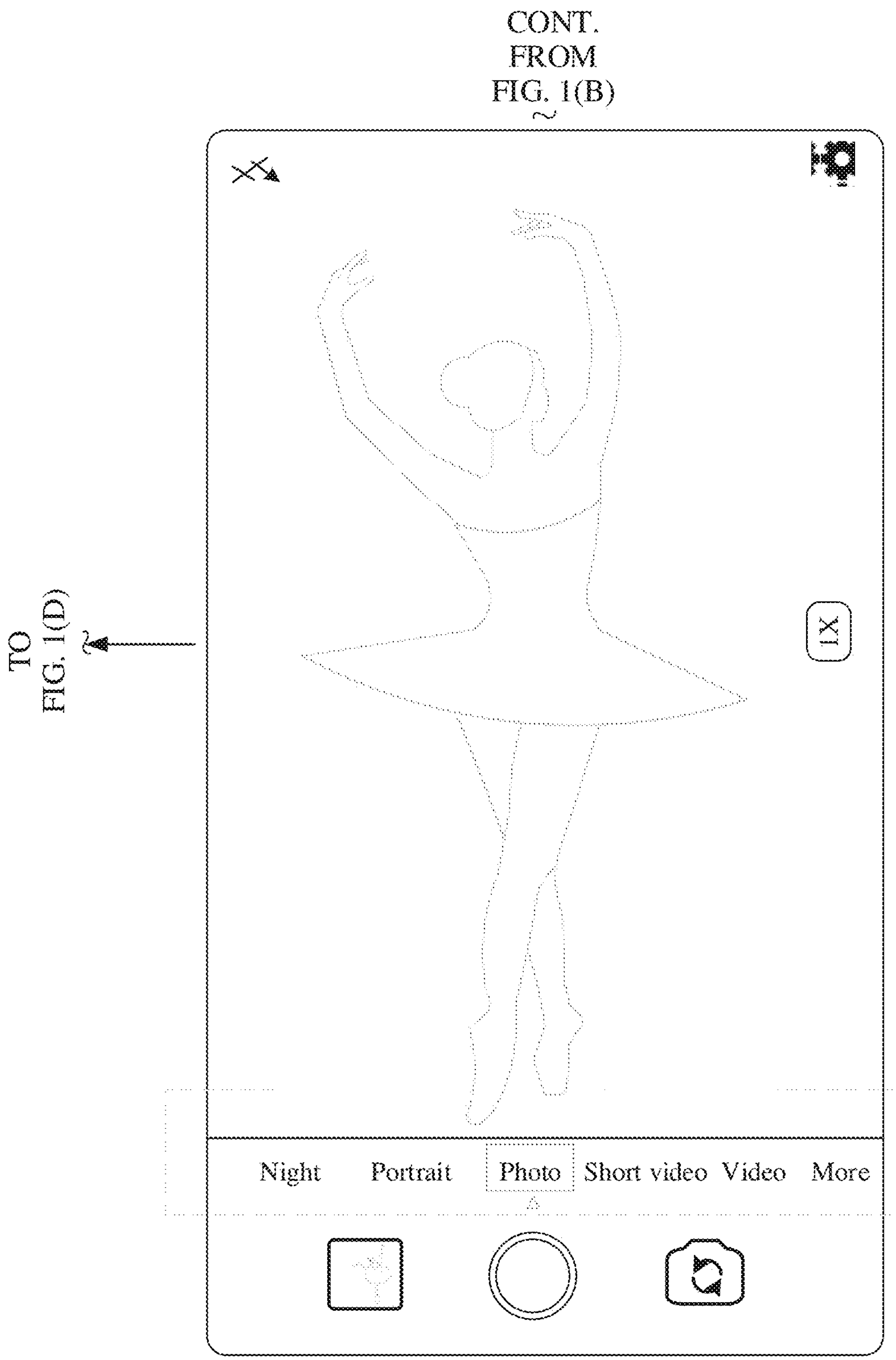
Figure 1D:
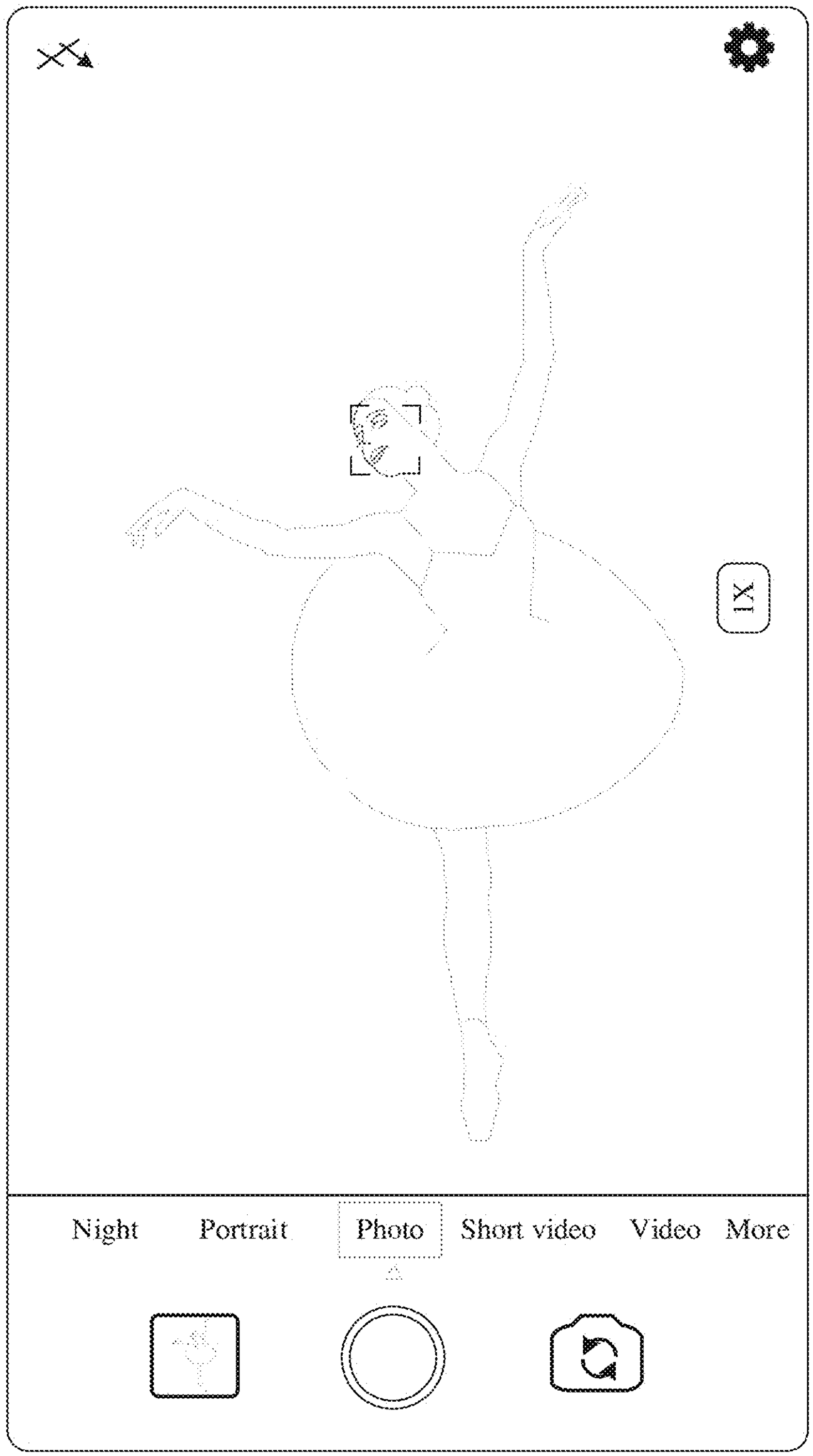

As shown in FIG. 1(B), the photographing interface 20 may include an echo control 201, a photographing control 202, a camera switching control 203, an image (viewfinder frame) 205 captured by a camera, a zoom ratio control 206A, a settings control 206B, a flash switch 206C, and one or more photographing mode controls 204 (for example, a "Night" control 204A, a "Portrait" control 204B, a "Photo" control 204C, a "Short video" control 204D, a "Video" control 204E, and a "More" control 204F). The echo control 201 may be used to display a captured image. The photographing control 202 is used to trigger saving of the image captured by the camera. The camera switching control 203 may be used to switch a photographing camera. The settings control 206B may be used to set a photographing function. The zoom ratio control 206A may be used to set a zoom multiple of the camera. The zoom ratio control 206B may trigger the electronic device 100 to display a zoom slide bar, and the zoom slide bar may receive an operation that the user slides upwards (or downwards), so that the electronic device 100 increases (or decreases) a zoom ratio of the camera. Possibly, the zoom ratio control 206B may include a zoom-in control and a zoom-out control displayed on the electronic device 100, the zoom-in control may be configured to: receive a user input, and trigger the electronic device 100 to increase the zoom ratio of the camera in response to the user input, and the zoom-in control may be configured to: receive a user input, and trigger the electronic device 100 to decrease the zoom ratio of the camera in response to the user input. The flash switch 206C is configured to turn on/off a flash. The photographing mode control may be configured to trigger an image processing procedure corresponding to starting of a photographing mode. For example, the "Night" control 204A may be configured to trigger an increase in brightness and color richness in the captured image. The "Portrait" control 204B may be configured to trigger blurring of a background of a person in the captured image. For descriptions in FIG. 1(C) and FIG. 1(D), refer to descriptions in FIG. 1(B). Details are not described again. As shown in FIG. 1(B) to FIG. 1(D), a photographing mode currently selected by the user is "Photo".

It should be noted that, in an actual photographing process, a focusing frame exists in the viewfinder frame, but the focusing frame may be displayed or may not be displayed. Whether the focusing frame is displayed in the viewfinder frame is not limited in this embodiment of this application. To clearly describe a situation of an exit from focusing, if the focusing frame is drawn in FIG. 1(A) to FIG. 1(D), it indicates that an exit from face focusing is not made, and if the focusing frame is not drawn in FIG. 1(A) to FIG. 1(D), it indicates that an exit from face focusing is made.

As shown in FIG. 1(B), a dancer is dancing in the viewfinder frame 205, and the focusing frame may focus on a face of the dancer. In the photographing process, a dancing action of the dancer constantly changes, and the face is sometimes detected and sometimes not detected in the focusing frame in the viewfinder frame.

As shown in FIG. 1(C), as the dancing action changes, when the dancer turns the back to the viewfinder frame, a face focusing frame in the viewfinder frame captures no face. In this case, the electronic device exits the face focusing frame.

As shown in FIG. 1(D), when the dancer faces the viewfinder frame again, and the face focusing frame in the viewfinder frame may detect the face again, the electronic device may generate the face focusing frame again.

In the foregoing focusing implementation, after the electronic device starts photographing, face focusing may start. In the photographing process, a location relationship between the electronic device and a focused object may constantly change. The focusing frame of the electronic device may not detect a corresponding target (that is, the focused object) in a short period of time. In this case, the electronic device may exit the focusing frame of the focused object. Consequently, when the target can be detected again, the target is focused on again. In the foregoing process, the target repeatedly disappears and appears in the viewfinder frame. Consequently, the focusing frame changes between "disappear" and "appear", and the user sometimes views the target clearly, and sometimes views the target unclearly. In this case, user experience is poor.

In view of the problem in the implementation, an embodiment of this application provides a focusing method. The method includes: When an electronic device does not detect a target, the electronic device may determine whether the target is not detected in a plurality of consecutive frames. If the target is not detected in a plurality of consecutive frames, the focusing frame continues to be switched to a central focusing frame (that is, an exit from the focusing frame is made); and if the target is detected in any one of the plurality of consecutive frames, the focusing frame is obtained (an exit from the focusing frame is not made). In this way, the exit from the focusing frame is delayed, frequent changes of the focused target in the viewfinder frame can be reduced, to reduce a quantity of changes between a clear image and an unclear image of a target that are presented in a viewfinder frame, so that user experience can be improved.

The following describes a focusing method provided in an embodiment of this application with reference to application scenarios.

In some application scenarios, an electronic device 100 may first determine whether a target can be detected, and delay an exit from a focusing frame when the target cannot be detected. To be specific, the exit from the focusing frame may be made when the target is not detected in a plurality of consecutive frames; and the exit from the focusing frame may not be made when the target is detected in any one of the plurality of consecutive frames. During photographing, the electronic device may determine, based on a size and/or a location of a focusing frame in a viewfinder frame, whether the target can be detected in the plurality of consecutive frames.

Figure 2A:
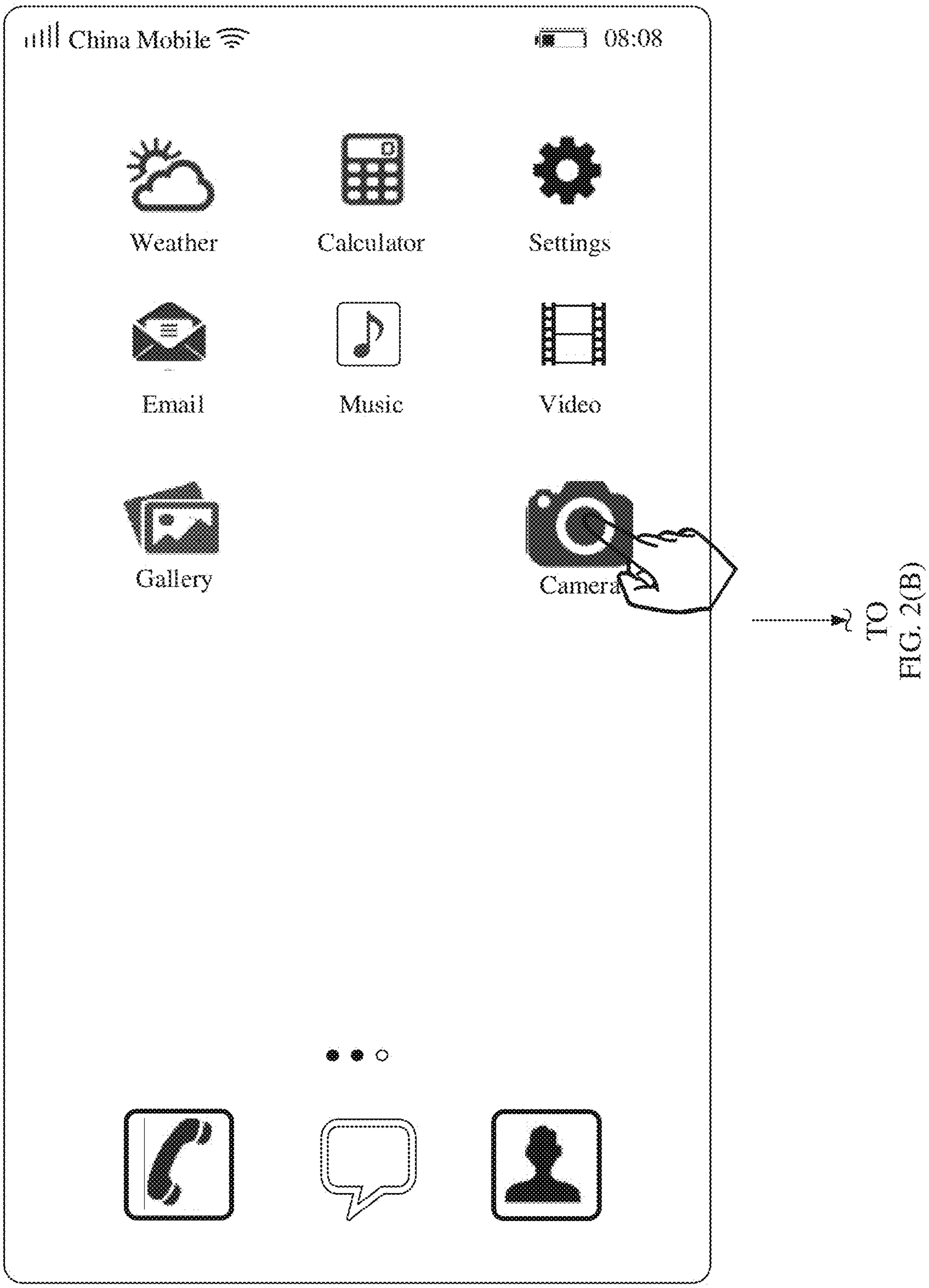
FIG. 2(A), FIG. 2(B), and FIG. 2(C) are a schematic diagram of a group of focusing preview interfaces according to an embodiment of this application.
Figure 2B:
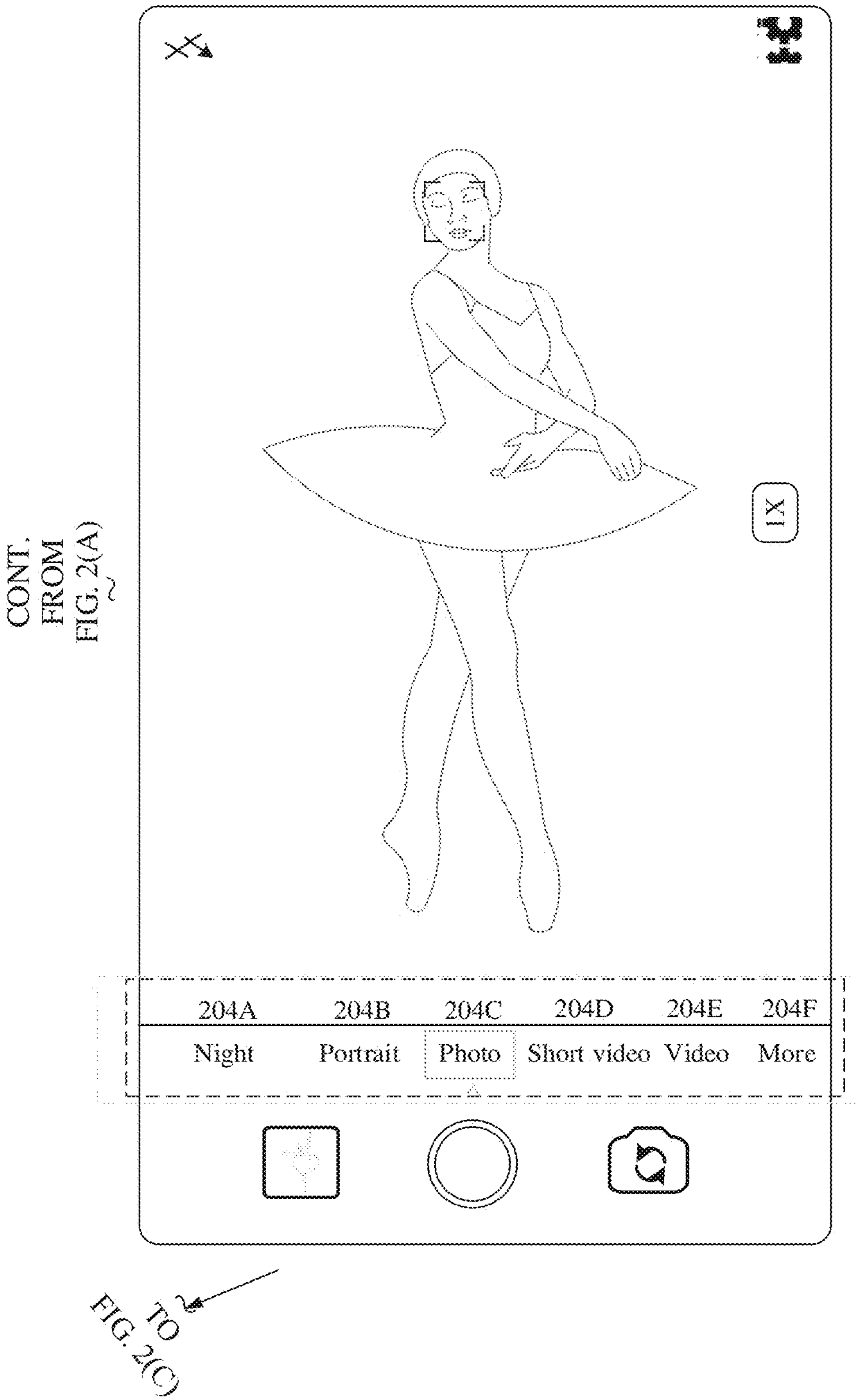
Figure 2C:
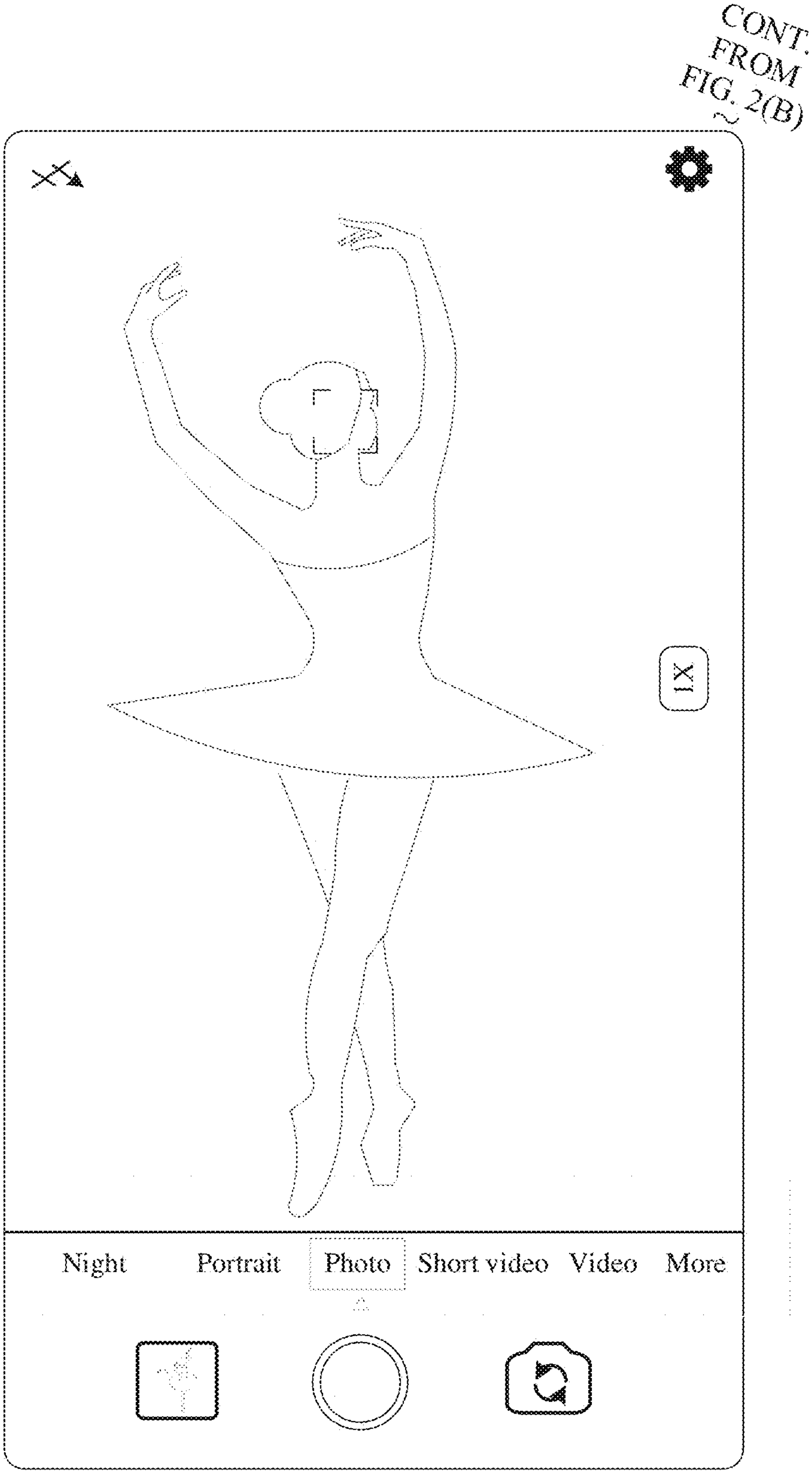

FIG. 2(A), FIG. 2(B), and FIG. 2(C) are a schematic diagram of a group of focusing preview interfaces. As shown in FIG. 2(A), for descriptions in FIG. 2(A), refer to descriptions corresponding to FIG. 1(A). Details are not described again.

The electronic device 100 may receive an input operation (for example, a tap) performed by a user on a Camera application icon, and in response to the input operation, the electronic device 100 may display a photographing interface 20 as shown in FIG. 2(B).

As shown in FIG. 2(B), for detailed descriptions in FIG. 2(B), refer to descriptions in FIG. 1(B). Details are not described again. As shown in FIG. 2(B), a photographing mode that may be selected by the user currently is "Photo", and the photographing mode is not limited herein.

As shown in FIG. 2(B), a dancer is dancing in a viewfinder frame 205, and the focusing frame may focus on a face of the dancer. In a photographing process, a dancing action of the dancer constantly changes, and the face is sometimes detected and sometimes not detected in the focusing frame in the viewfinder frame. The target is the face.

For descriptions in FIG. 2(C), also refer to the descriptions in FIG. 1(B). Details are not described again. As shown in FIG. 2(C), as the dancing action changes, when the dancer turns the back to the viewfinder frame, a face focusing frame in the viewfinder frame does not capture (detect) the face. In this embodiment of this application, the electronic device may determine whether the face is not detected in the viewfinder frame in several consecutive frames (for example, eight frames), and may exit the face focusing frame if the face is not detected in the viewfinder frame in the several consecutive frames; or may not exit a face defocusing frame if the face is detected in the viewfinder frame in any one of several consecutive frames. In other words, a plurality of frames of preview images may be detected in this application, to delay an exit from face focusing.

In a possible case, when the electronic device detects the target in at least one of several consecutive frames, the focusing frame is kept from an exit. When the face is detected again, the focusing frame may be moved to a corresponding location.

Figure 3A:
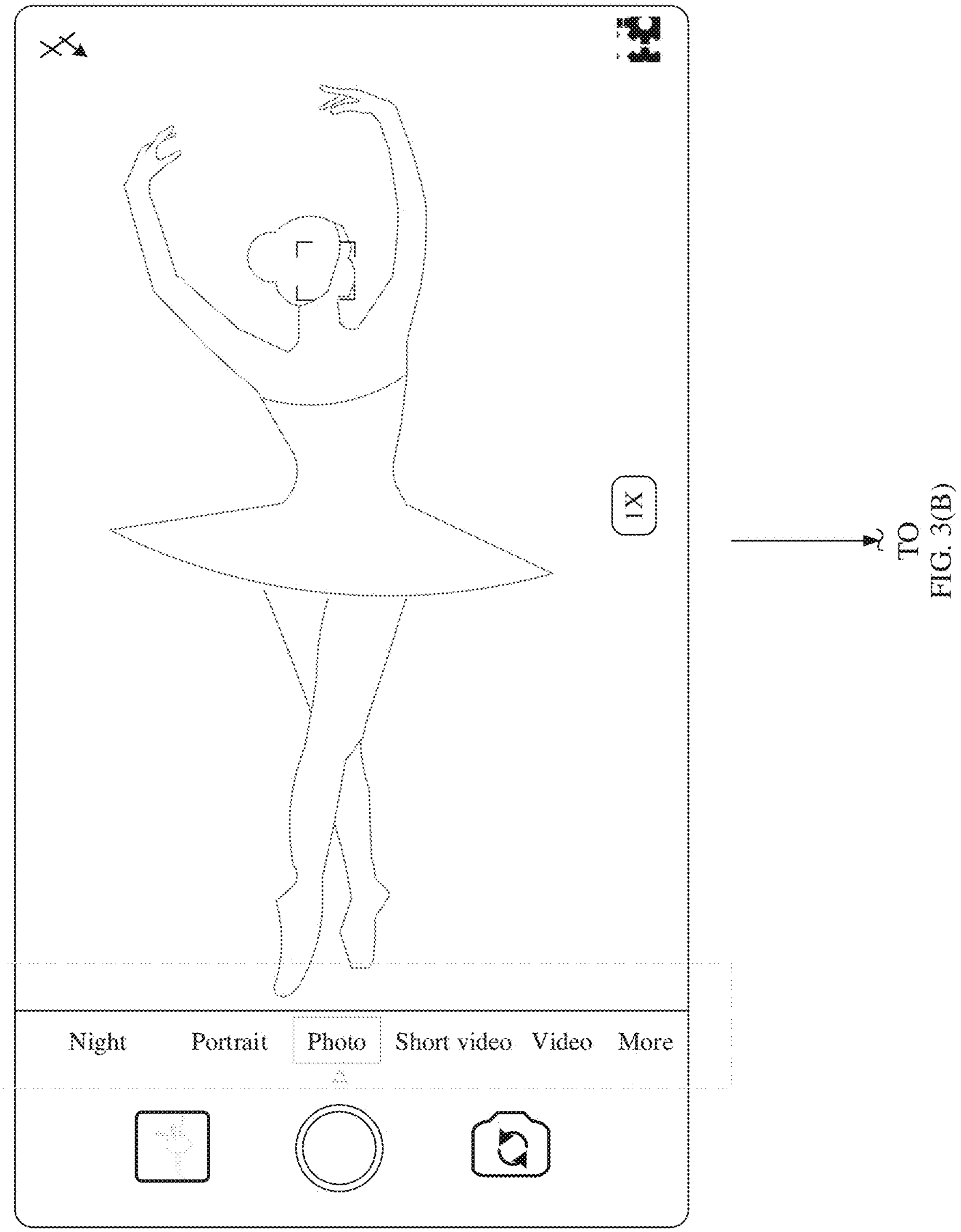
FIG. 3(A) and FIG. 3(B) are a schematic diagram of a group of focusing preview interfaces according to an embodiment of this application.
Figure 3B:
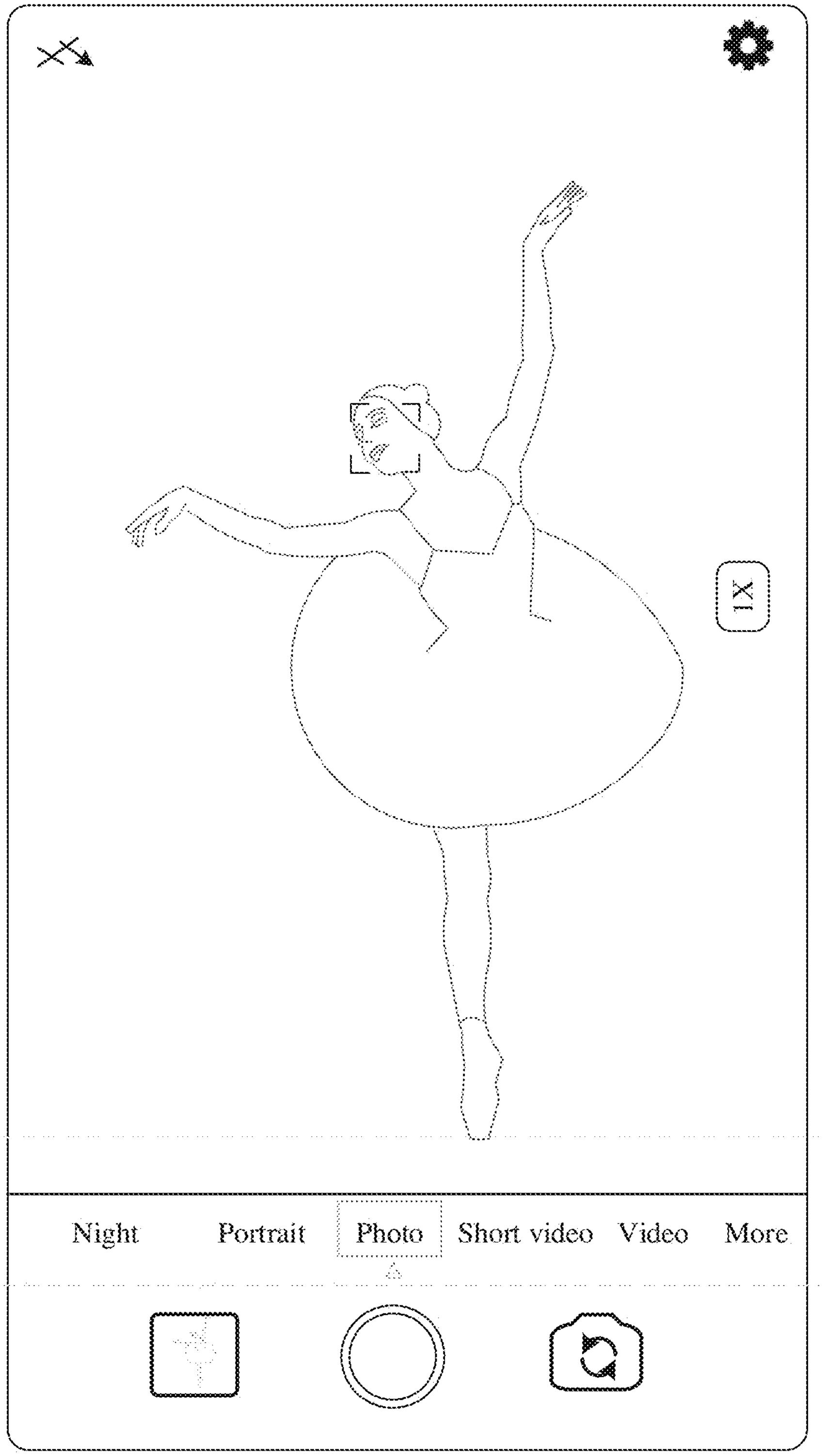

FIG. 3(A) and FIG. 3(B) are a schematic diagram of a group of face focusing preview interfaces. The face focusing frame may be kept if a viewfinder frame that may detect the face exists in several consecutive frames. As shown in FIG. 3(A), when the face is not detected, the electronic device may keep the face focusing frame from an exit in the several consecutive frames. As shown in FIG. 3(B), in several consecutive seconds, when the dancer faces the viewfinder frame again, and the face focusing frame in the viewfinder frame may capture the face again, the face focusing frame may continue to focus on a location of the face. In this case, even if the face is not detected in a short period of time, the exit from the face focusing frame may still not be made. When the face is detected again, the face focusing frame is moved to the location of the face. For descriptions in FIG. 3(A) and FIG. 3(B), also refer to the descriptions in FIG. 1(B). Details are not described again.

In another possible case, when the electronic device does not detect the target in several consecutive frames, the focusing frame is kept from an exit in the several consecutive frames, and then the exit from the focusing frame may be made. When the face is detected again, the focusing frame for the target may be enabled again.

Figure 4A:
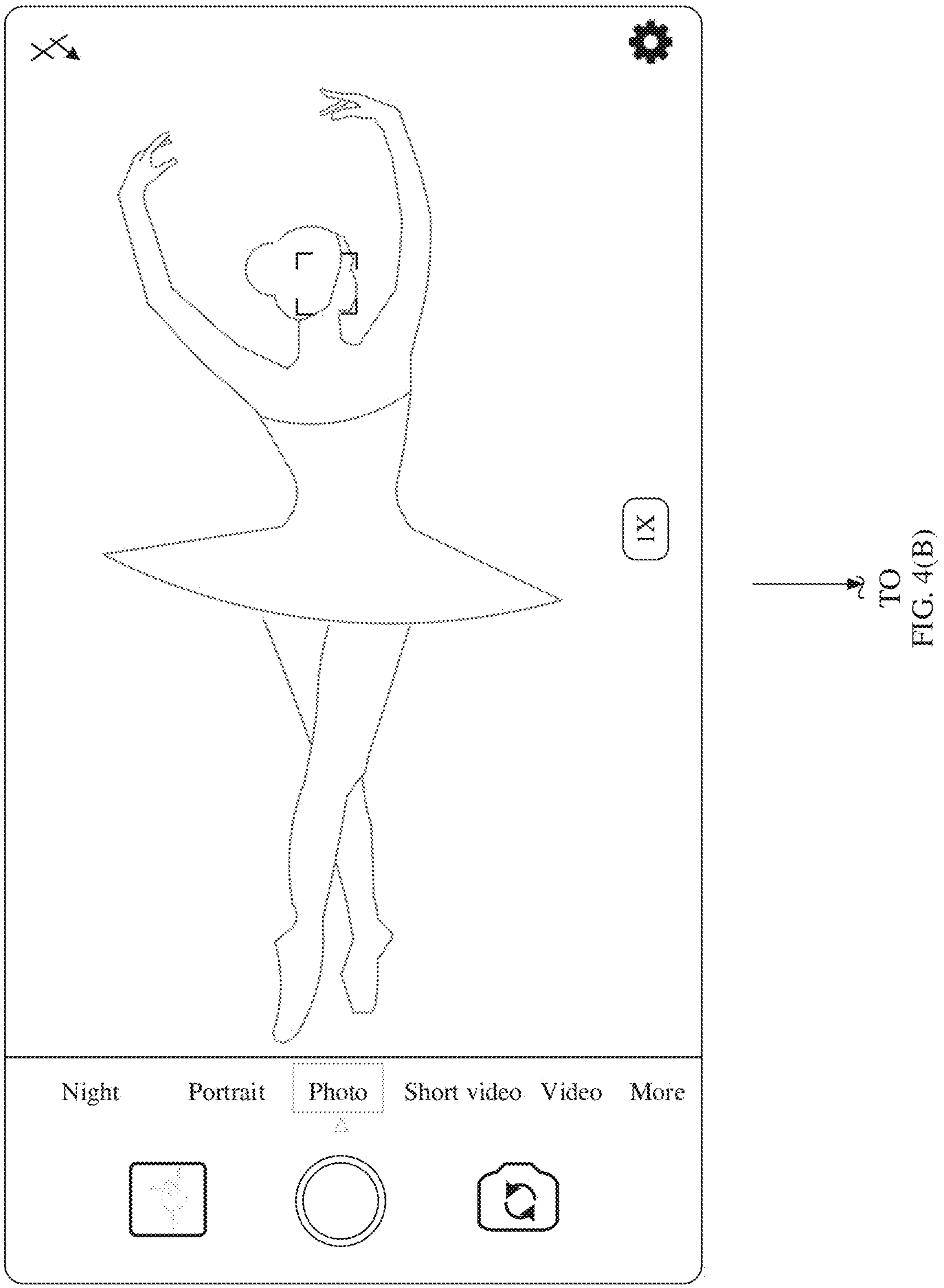
FIG. 4(A) to FIG. 4(C) are a schematic diagram of a group of focusing preview interfaces according to an embodiment of this application.
Figure 4B:
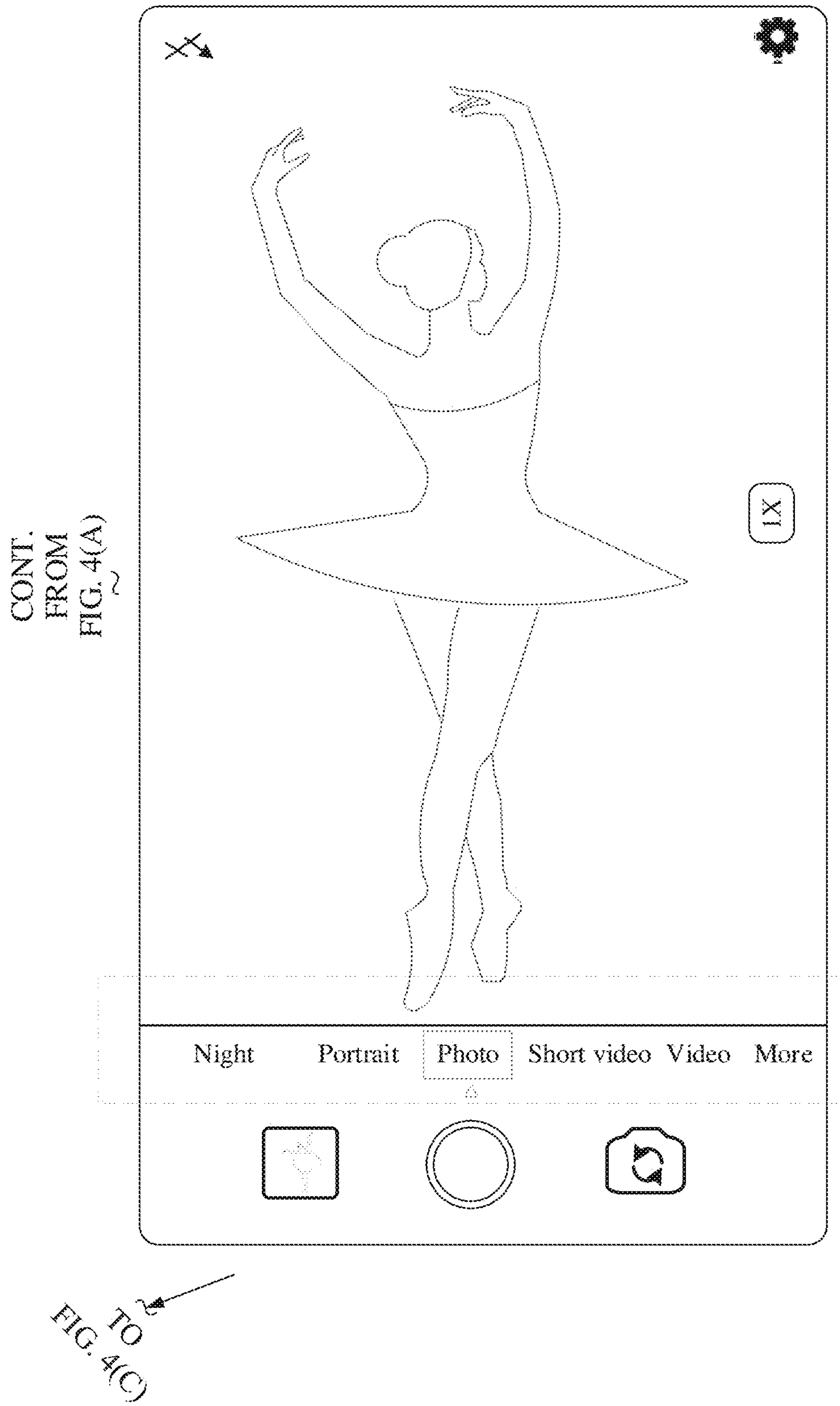
Figure 4C:

FIG. 4(A) to FIG. 4(C) are a schematic diagram of a group of focusing preview interfaces. An exit from the face focusing frame may be made if the viewfinder frame that may detect the face does not exist in several consecutive frames. As shown in FIG. 4(A), when the face is not detected, the electronic device may keep the face focusing frame from an exit in the several consecutive frames. As shown in FIG. 4(B), in several consecutive seconds, when the dancer still turns the back to the viewfinder frame, and the viewfinder frame still cannot capture the face, the exit from the face focusing frame may be made. As shown in FIG. 4(C), as the dancing action changes, when the dancer faces the viewfinder frame again, and the face can be detected again, the face may be focused on again. For descriptions in FIG. 4(A) to FIG. 4(C), also refer to the descriptions in FIG. 1(B). Details are not described again.

Further, a method for detecting whether a face exists in a viewfinder frame (that is, a method that can be used to capture or detect a target) in an embodiment of this application is described below with reference to application scenarios.

Implementation 1: Determine, based on a size of a face bounding box, whether the face can be detected.

Figure 5:
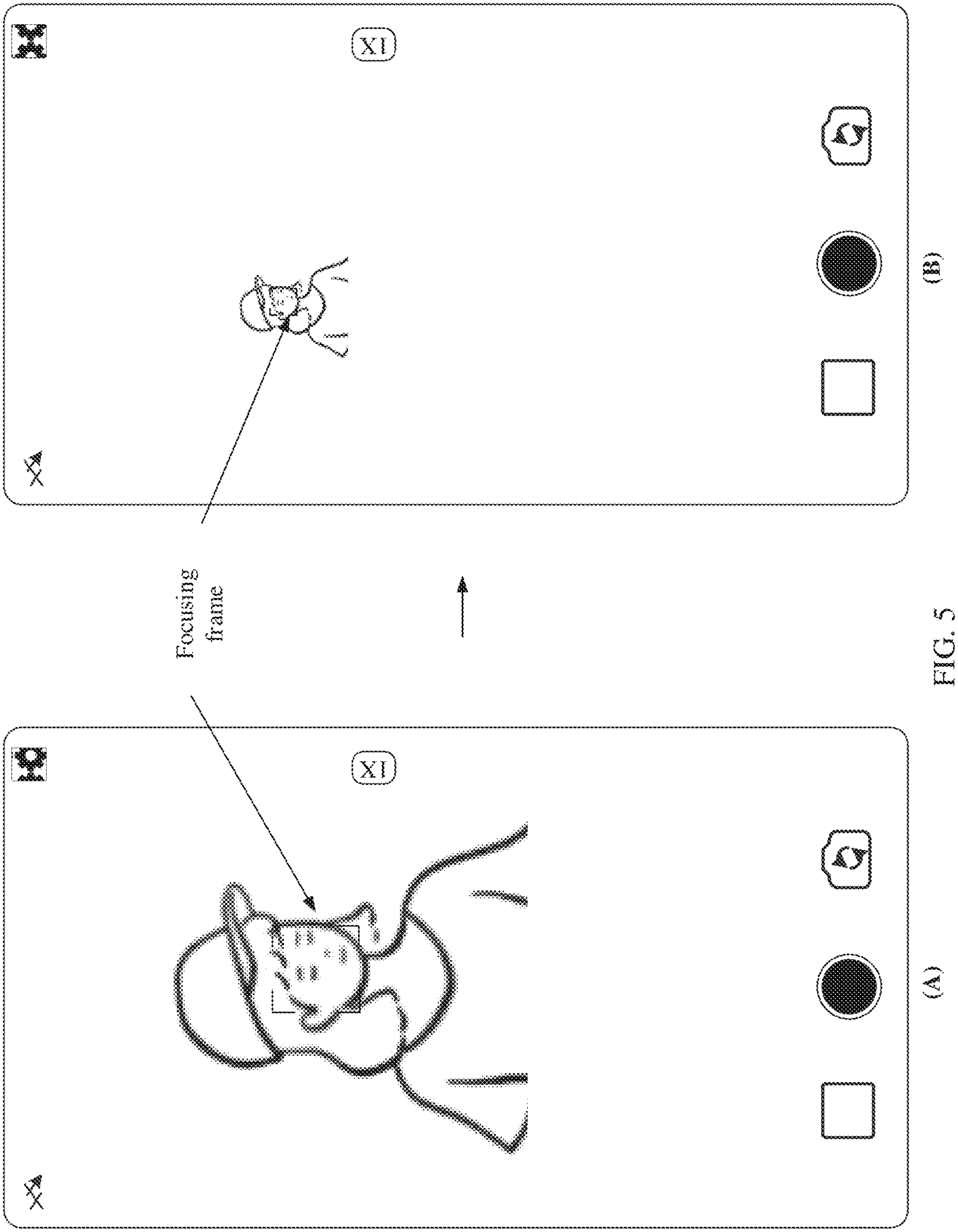
FIG. 5 is a schematic diagram of a group of focusing preview interfaces according to an embodiment of this application.

FIG. 5 is a schematic diagram of a group of focusing preview interfaces. When an operation shown in FIG. 1(A) is performed, an electronic device may display an interface schematic shown in (A) in FIG. 5. For descriptions in (A) and (B) in FIG. 5, refer to FIG. 1(B). Details are not described again. As shown in FIG. 3(A), in the viewfinder frame, the electronic device may focus on the face. As a person goes farther, a face focusing frame becomes smaller. As shown in FIG. 3(B), when the focusing frame is less than a specified value (for example, a pixel value 30*30), it can be determined that the face is not detected (captured).

It should be noted that a case in which the face bounding box becomes smaller is not limited to a case in which the person becomes farther away from a camera, and may be that the person turns or lowers the head, may be that the person goes out of a range of the viewfinder frame, or the like. For the foregoing cases, no limitation is imposed in this application.

Implementation 2: Determine, based on a location of a face bounding box, whether the face can be detected.

Figure 6:
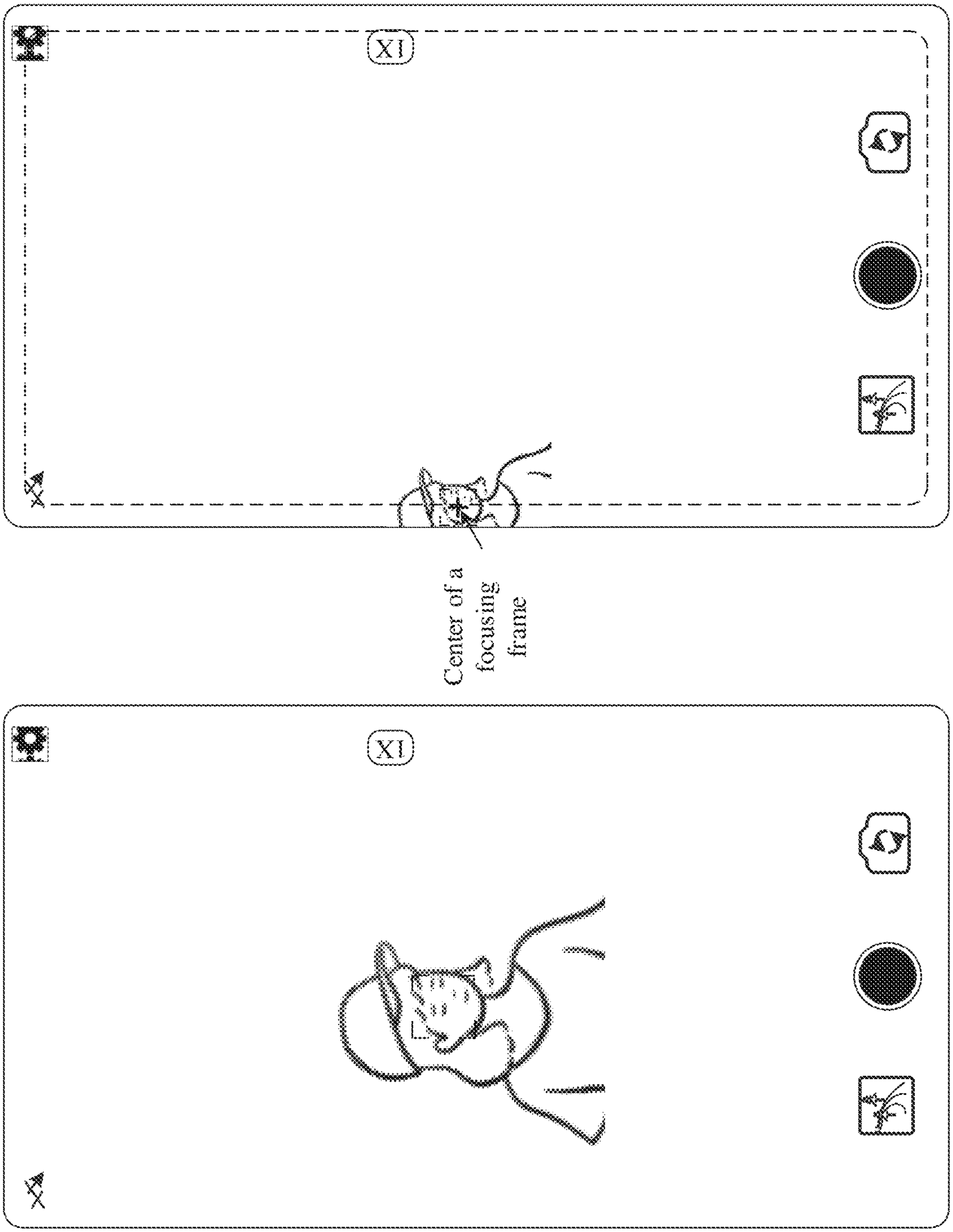
FIG. 6 is a schematic diagram of a group of focusing preview interfaces according to an embodiment of this application.

FIG. 6 is a schematic diagram of a group of focusing preview interfaces. When an operation shown in FIG. 1(A) is performed, an electronic device may display an interface schematic shown in (A) in FIG. 6. For descriptions in (A) and (B) in FIG. 6, refer to FIG. 1(B). Details are not described again. As shown in (A) in FIG. 6, in the viewfinder frame, the electronic device may focus on the face. In a process in which a person moves, the face moves from a middle location of the viewfinder frame to an edge location. As shown in (B) in FIG. 6, when a location of a focusing frame is at an edge location of the viewfinder frame, it may be determined that the face is not detected. That the location of the focusing frame is at the edge location of the viewfinder frame may be that a center of the focusing frame is at the edge location, the center of the focusing frame is a geometric center of the focusing frame, and the edge location of the viewfinder frame may be a specific range within a boundary of the viewfinder frame (for example, an area range with a pixel value of 20 within the boundary of the viewfinder frame), for example, a range of the viewfinder frame outside a dashed line in (B) in FIG. 6.

A detected object may not be limited to the face, and may alternatively be an object, for example, an animal or a vehicle, which is not limited.

It should be noted that, in a process of specifically determining that the face can be detected, whether the face can be detected may be determined by selecting Implementation 1 or Implementation 2 as a determining basis or by using both Implementation 1 and Implementation 2 as a determining basis. When Implementation 1 and Implementation 2 are used as a determining basis, provided that one of the two implementations is satisfied, it can be determined that the face is not detected. A determining sequence of Implementation 1 and Implementation 2 is not limited.

The following describes another focusing method provided in an embodiment of this application with reference to application scenarios.

FIG. 7(A), FIG. 7(B), FIG. 7(C), and FIG. 7(D) are a schematic diagram of a group of focusing preview interfaces. For descriptions in FIG. 7(A), FIG. 7(B), FIG. 7(C), and FIG. 7(D), refer to descriptions in FIG. 1(B). Details are not described again.

When a head lowers, looks up, or turns to a side, focusing manners of a face are as follows:

Implementation 1: A height and a width of a face focusing frame are reduced in an equal proportion.

Figure 7A:
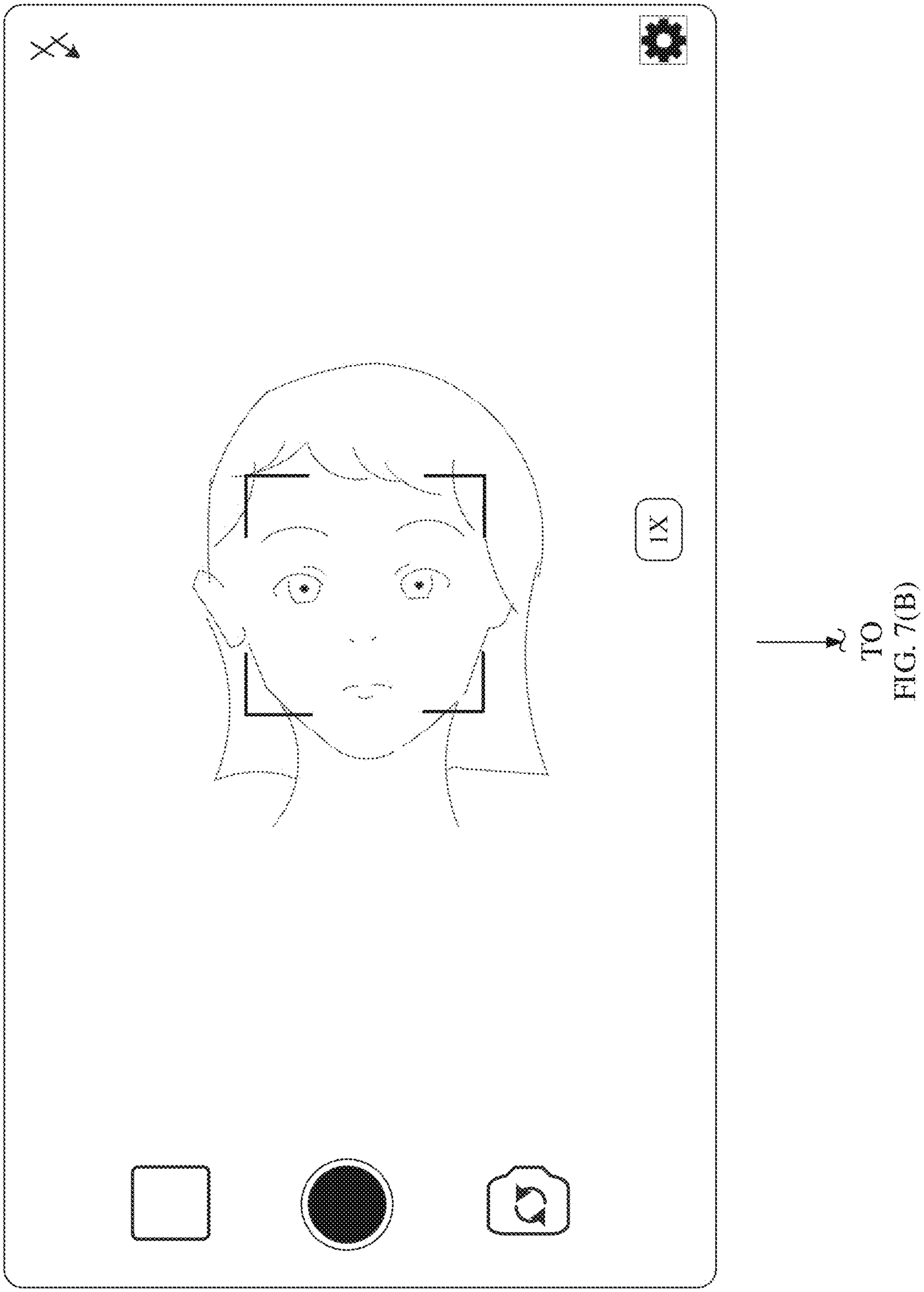
FIG. 7(A), FIG. 7(B), FIG. 7(C), and FIG. 7(D) are a schematic diagram of a group of focusing preview interfaces according to an embodiment of this application.
Figure 7B:
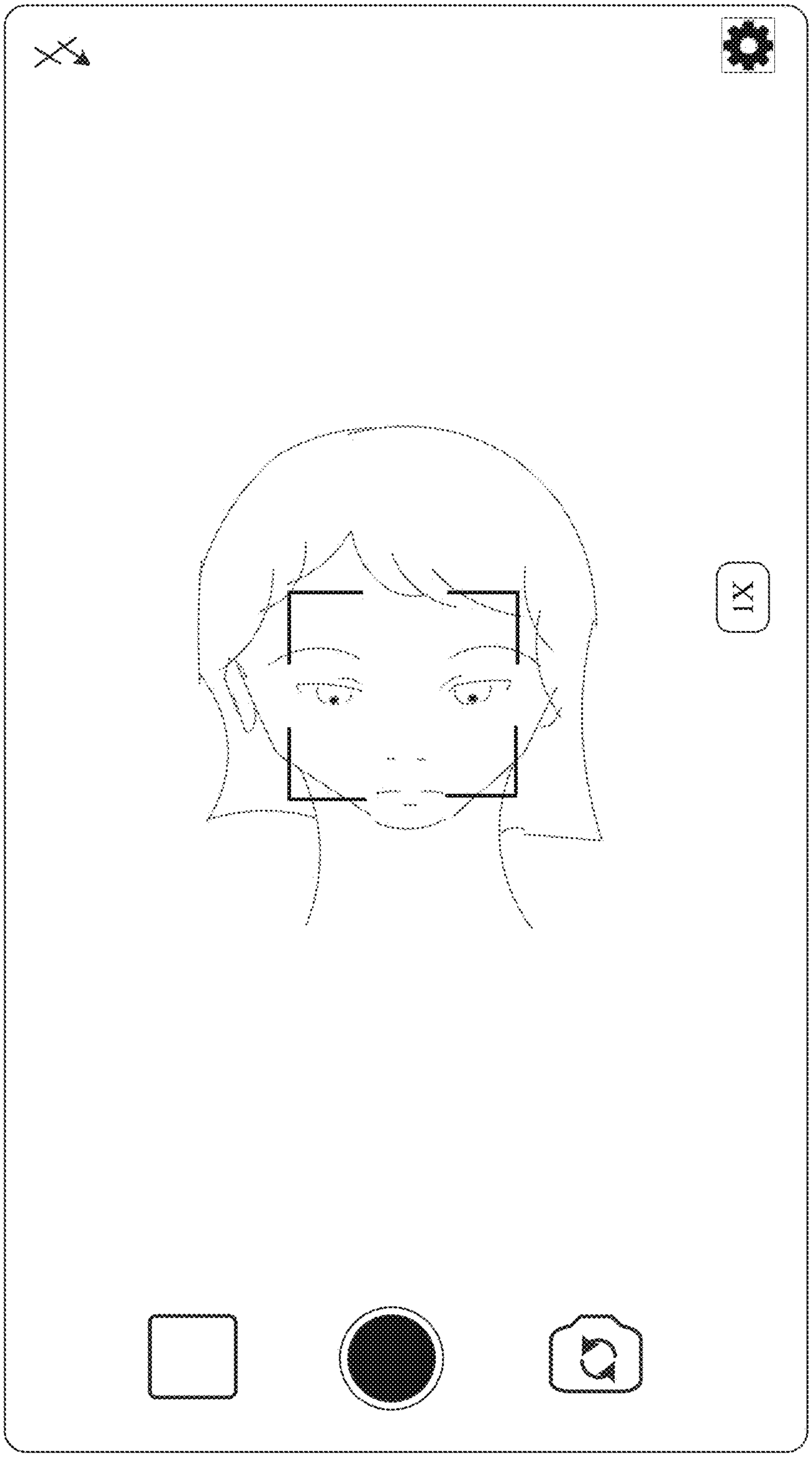

As shown in FIG. 7(A), a front face of a person is displayed in a viewfinder frame, and an electronic device may focus on the face. As shown in FIG. 7(B), when the face faces downwards, a size of the viewfinder frame becomes smaller accordingly. In other words, a focusing frame is reduced in an equal proportion based on the height and the width.

In a focusing solution in the foregoing implementation, in a process in which the face faces downwards, a height in an up and down direction of the face is reduced, but a width in a left and right direction is unchanged. When the width and the height of the focusing frame remain the same in the process of being reduced (the height and the width are reduced in an equal proportion), a part that is of the face and that is at an edge cannot be focused on. Therefore, there is a problem that the focusing frame is not large enough, and a focusing range is incomplete.

It should be noted that the foregoing merely provides example descriptions of a case in which the face focusing frame becomes smaller in a process in which a person lowers the head. When the person raises the head, turns the head to a side, or rotates the head, the face focusing frame becomes smaller in a same manner. This is not limited herein.

Implementation 2: Keep a size of the face focusing frame unchanged.

Figure 7C:
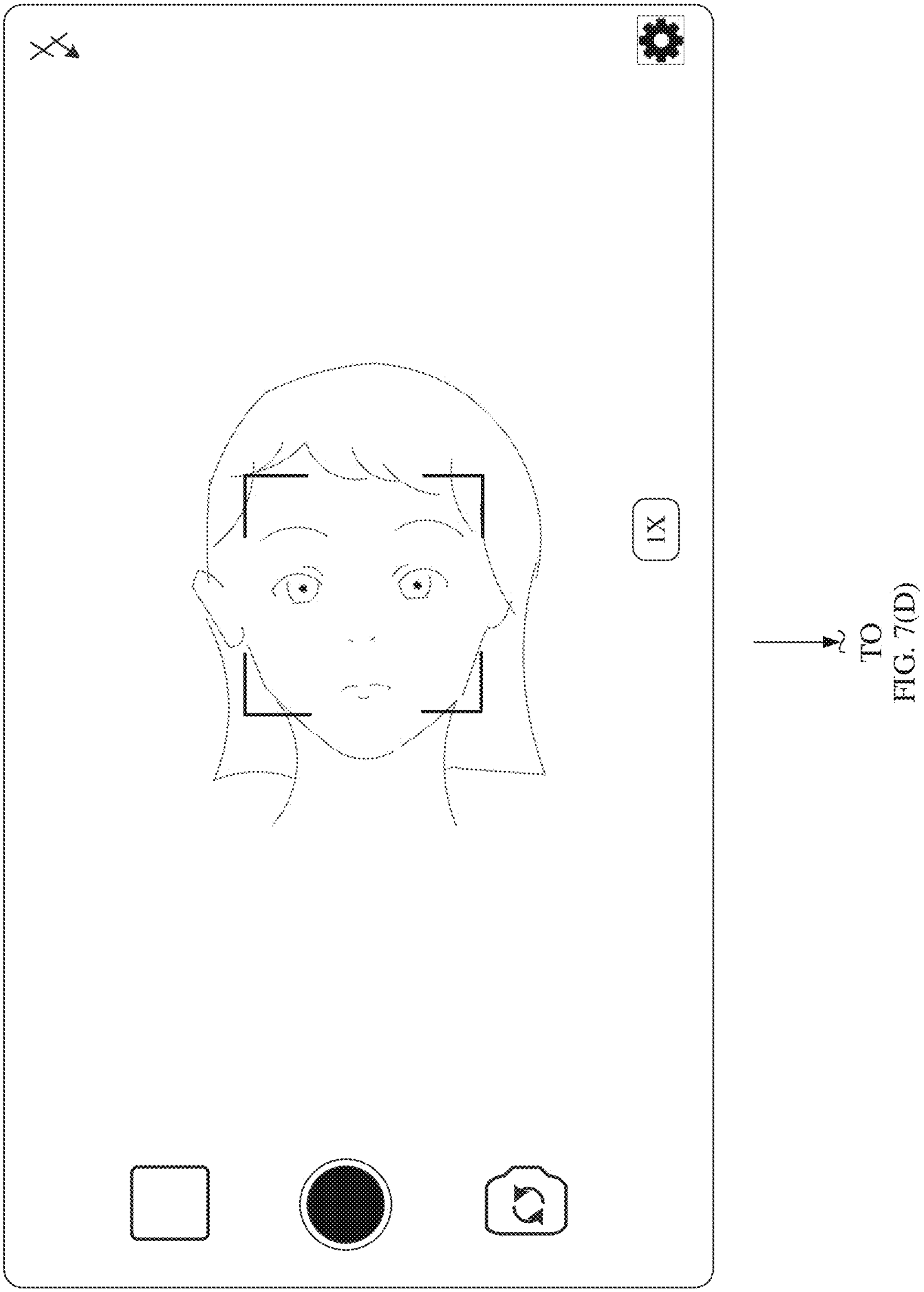
Figure 7D:
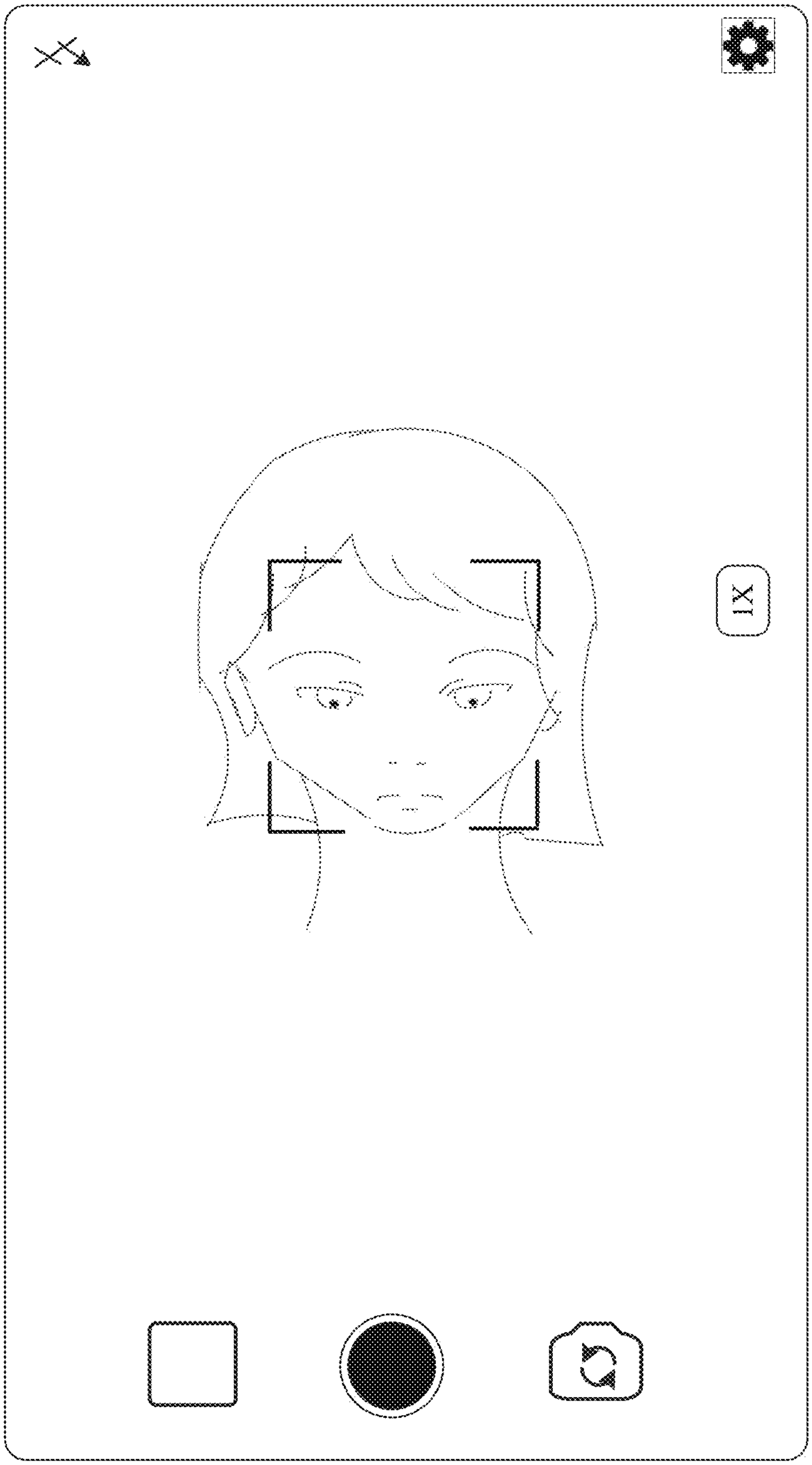

As shown in FIG. 7(C), a front face of a person is displayed in a viewfinder frame, and an electronic device may focus on the face. As shown in FIG. 7(D), when the face faces downwards, the size of the viewfinder frame remains unchanged.

In a focusing solution in the foregoing implementation, in a process in which the face faces downwards, a height in an up and down direction of the face is reduced, but a width in a left and right direction is unchanged. When a size of a focusing frame remains unchanged, upper and lower edges of the focusing frame cannot focus on the face, but a focusing vacancy occurs.

It should be noted that the foregoing merely provides example descriptions of a case in which the face focusing frame becomes smaller in a process in which a person lowers the head. When the person raises the head, turns the head to a side, or rotates the head, the face focusing frame becomes smaller in a same manner. This is not limited herein.

In the foregoing two implementations, as the head of the person rotates, if the face focusing frame is adjusted to be too small, the focusing frame is too small and a part of the face is not focused on; and if the face focusing frame remains unchanged, a focusing frame vacancy occurs. Therefore, the face cannot be accurately focused on in a scenario in which the person turns the face to one side, lowers the head, raises the head, or the like.

In the foregoing implementations, the electronic device may correspondingly adjust a height and/or a width of the face focusing frame based on a face rotation direction. When the face rotates upwards/downwards (the head is lowered/raised), the electronic device may reduce a height in an up and down direction of the focusing frame and keep a width in a left and right direction unchanged. When the face rotates leftwards/rightwards (the head rotates to one side or shakes), the electronic device may reduce the width in the left and right direction of the focusing frame and keep the height in the upper and lower direction unchanged. In this way, the electronic device can reduce the focusing frame only in the head rotation direction, to avoid a problem that a vacancy occurs when the focusing frame becomes too large and focusing is incomplete when the focusing frame becomes too small, thereby improving focusing accuracy.

FIG. 8(A), FIG. 8(B), FIG. 8(C), and FIG. 8(D) are a schematic diagram of a group of focusing preview interfaces. For descriptions in FIG. 8(A) to FIG. 8(D), refer to descriptions in FIG. 1(B). Details are not described again.

Figure 8A:
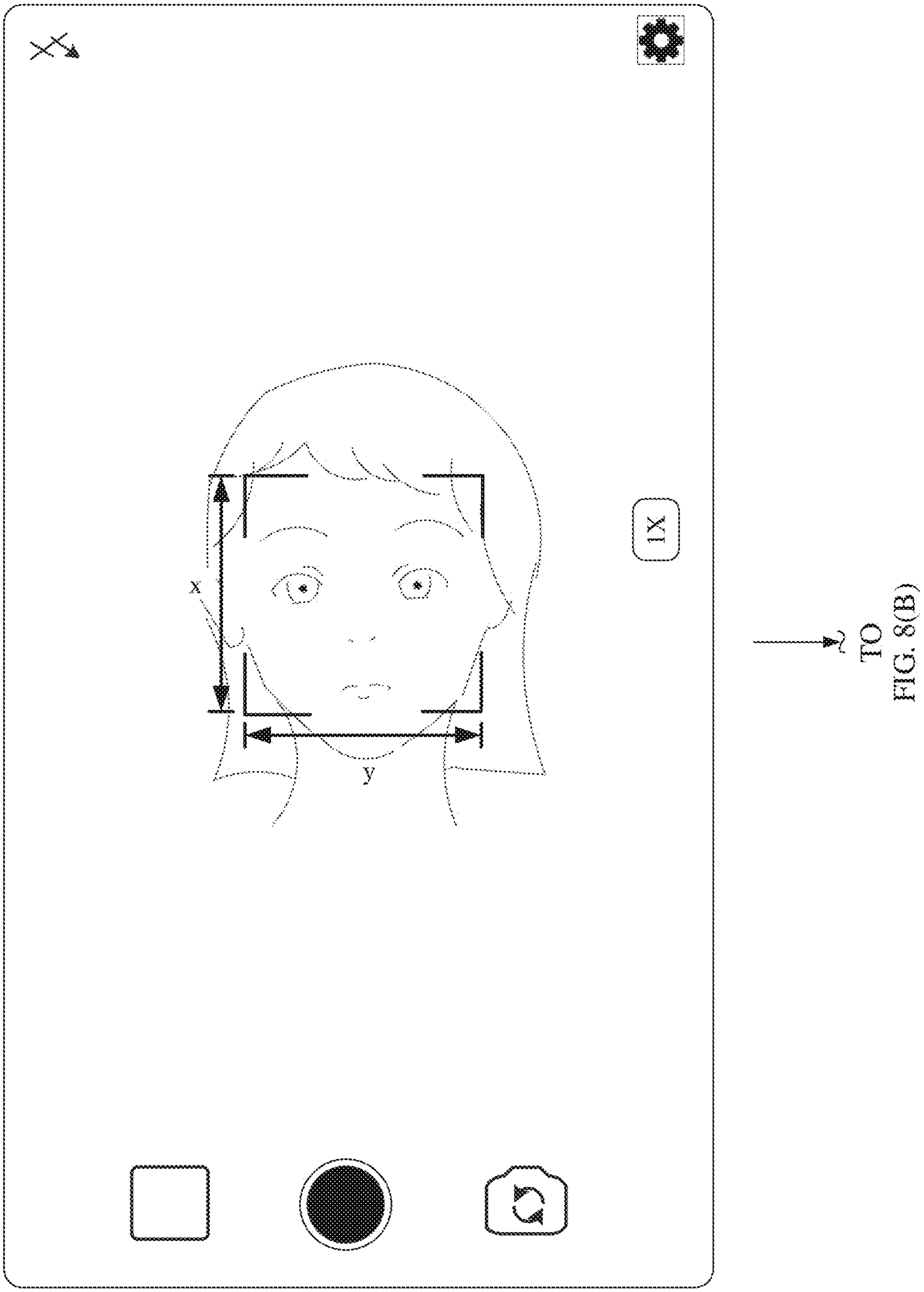
FIG. 8(A), FIG. 8(B), FIG. 8(C), and FIG. 8(D) are a schematic diagram of a group of focusing preview interfaces according to an embodiment of this application.
Figure 8B:
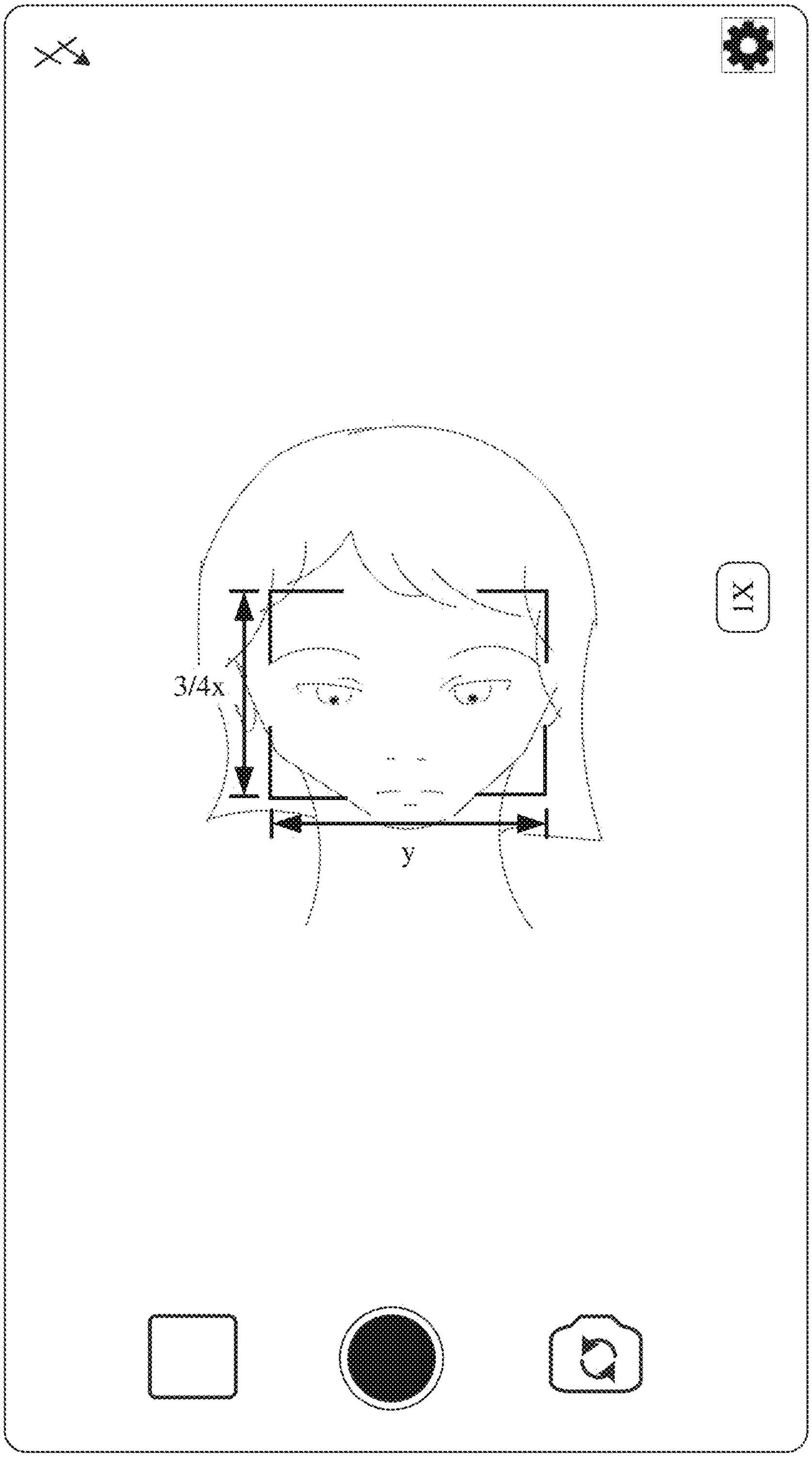

As shown in FIG. 8(A), when a front face of a person is displayed in a viewfinder frame, an electronic device may focus on the front face of the person. A height (in the up and down direction) of a focusing frame is x, a width is y, and x and y may be equal or unequal. As shown in FIG. 8(B), x may be reduced when a face (the head) rotates in an up and down (vertical) direction. For example, the electronic device may detect an attitude angle of the face rotating in the up and down direction, and may adjust x to ¾x when the attitude angle of rotating in the up and down direction is greater than a specific angle.

It should be noted that the attitude angle is an angle at which the head of the person rotates, and the attitude angle of rotating in the up and down direction is an angle at which the head rotates in the up and down direction (the head is lowered or raised). When the face faces a screen, the attitude angle in the up and down direction is zero degrees. The height x is adjusted through an action of lowering the head, or an action of rotating the head in the up and down direction, for example, raising the head, looking up, or nodding the head.

Figure 8C:
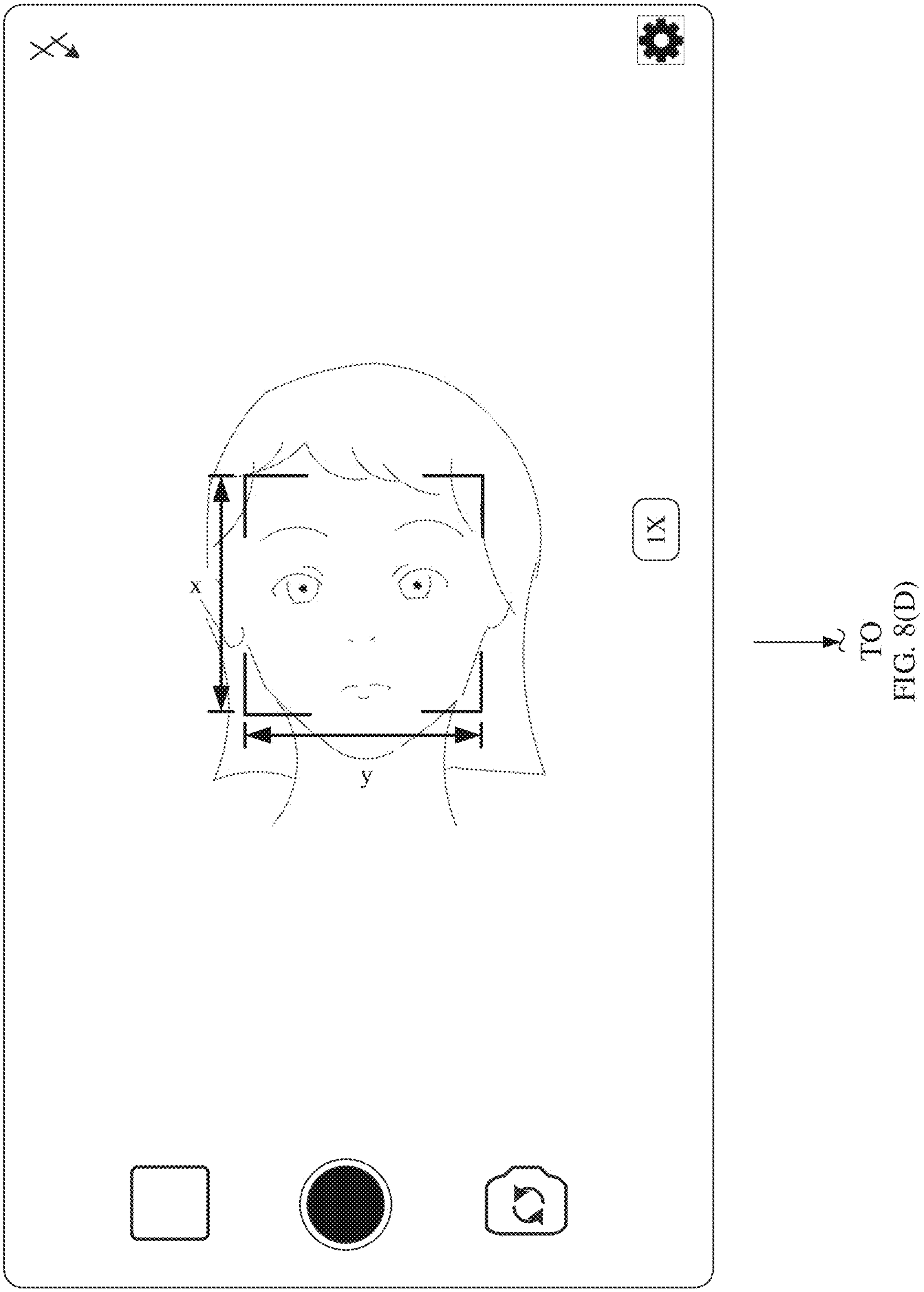
Figure 8D:
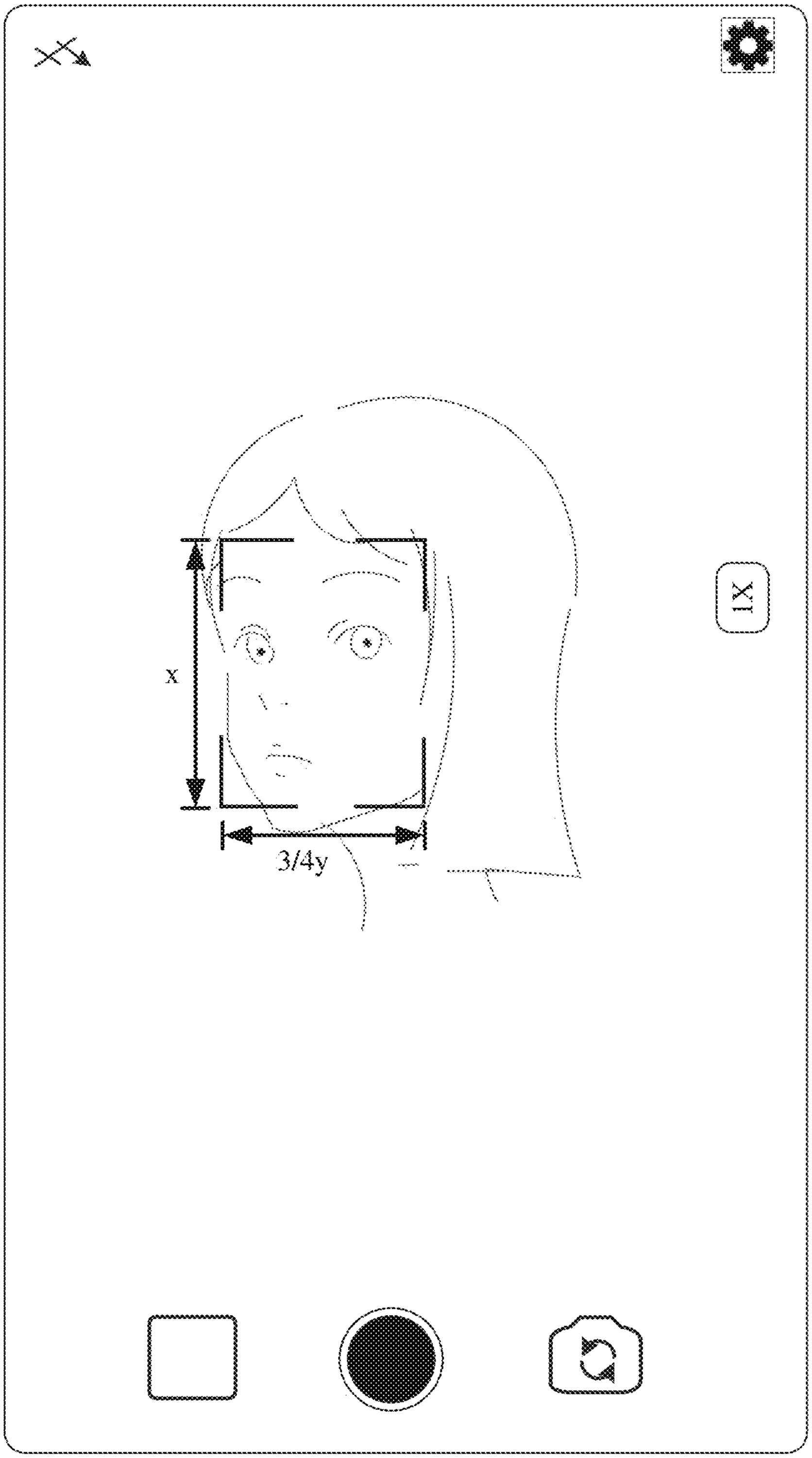

For descriptions in FIG. 8(C), refer to the descriptions in FIG. 8(A). Details are not described again. As shown in FIG. 8(D), when the face rotates in a horizontal direction (the head rotates leftwards/rightwards or turns to a side), the electronic device may reduce y. For example, the electronic device may detect an attitude angle of leftward/rightward (horizontal) rotation of the face, and may adjust y to ¾y when the attitude angle of leftward/rightward rotation is greater than a specific angle.

It should be noted that the attitude angle of leftward/rightward rotation may be an angle of leftward/rightward rotation of the head. When the face faces the screen, the attitude angle of horizontal rotation is also zero degrees. The width y is adjusted through an action of turning the head leftwards, or an action of rotating the head in a horizontal direction, for example, turning the head rightwards, or shaking the head.

It should be understood that a size of the focusing frame is adjusted by adjusting only x, by adjusting only y, or by adjusting both x and y.

It should be noted that when the person turns the front face to face the viewfinder frame after lowering the head, looking up, turning the head to a side, the focusing frame may be correspondingly adjusted to an original size, which may be a reverse process of the process in FIG. 8(A), FIG. 8(B), FIG. 8(C), and FIG. 8(D).

The following describes still another focusing method provided in an embodiment of this application with reference to application scenarios.

An implementation of exiting a face focusing frame is described below with reference to scenarios.

Figure 9A:
FIG. 9(A) and FIG. 9(B) are a schematic diagram of a group of focusing preview interfaces according to an embodiment of this application.
Figure 9B:
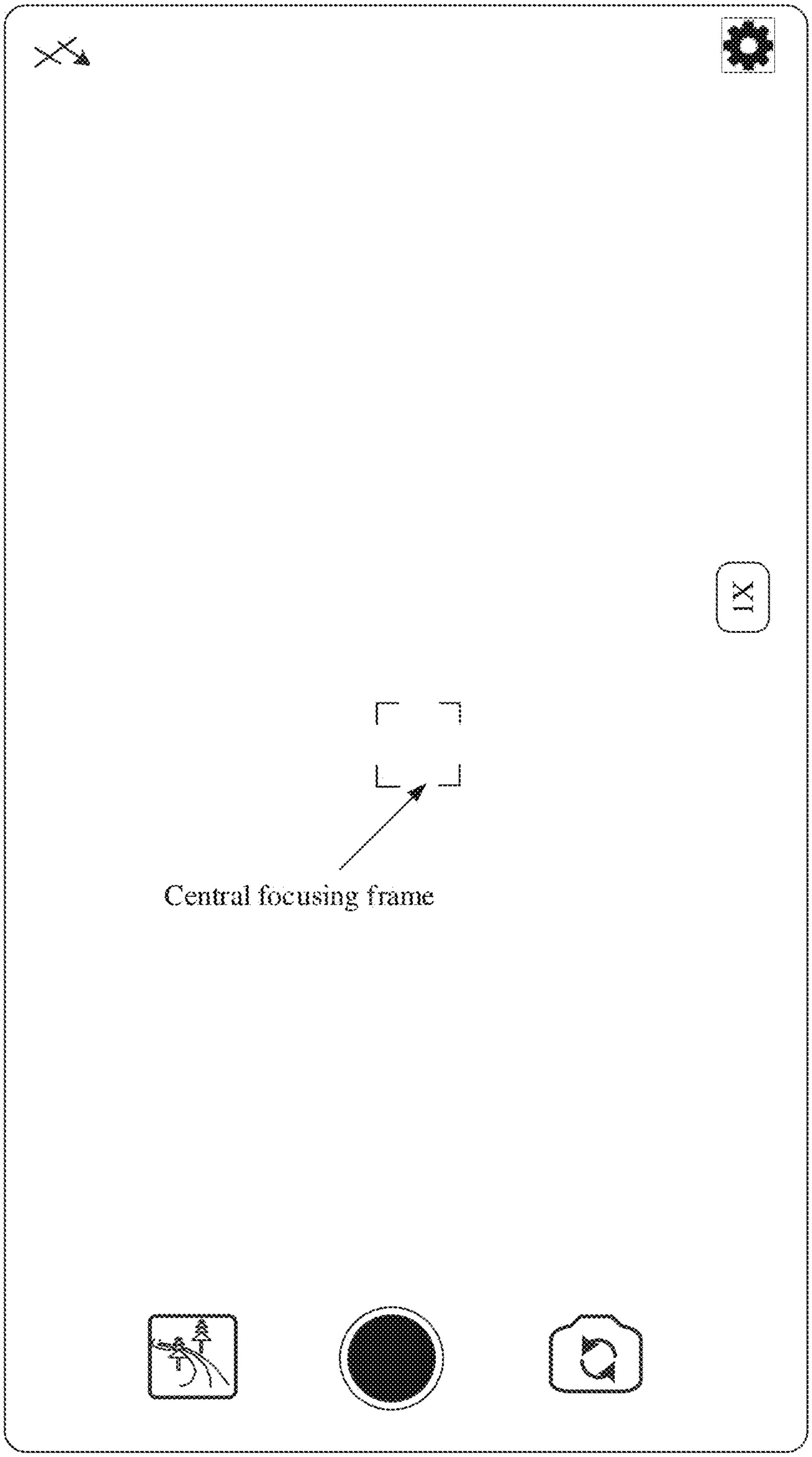
Figure 10A:
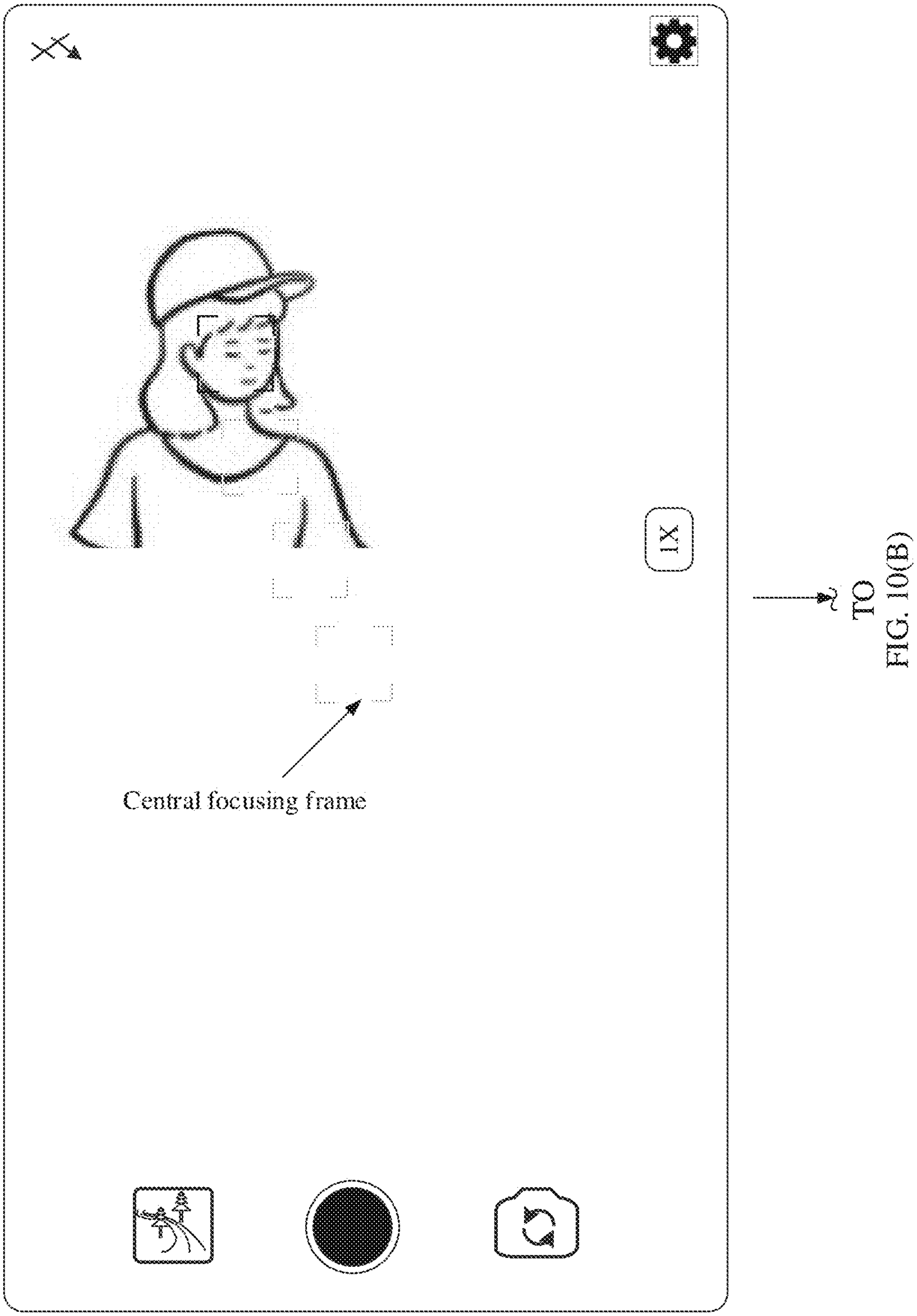
FIG. 10(A), FIG. 10(B), FIG. 10(C), and FIG. 10(D) are a schematic diagram of a group of focusing preview interfaces according to an embodiment of this application.
Figure 10B:
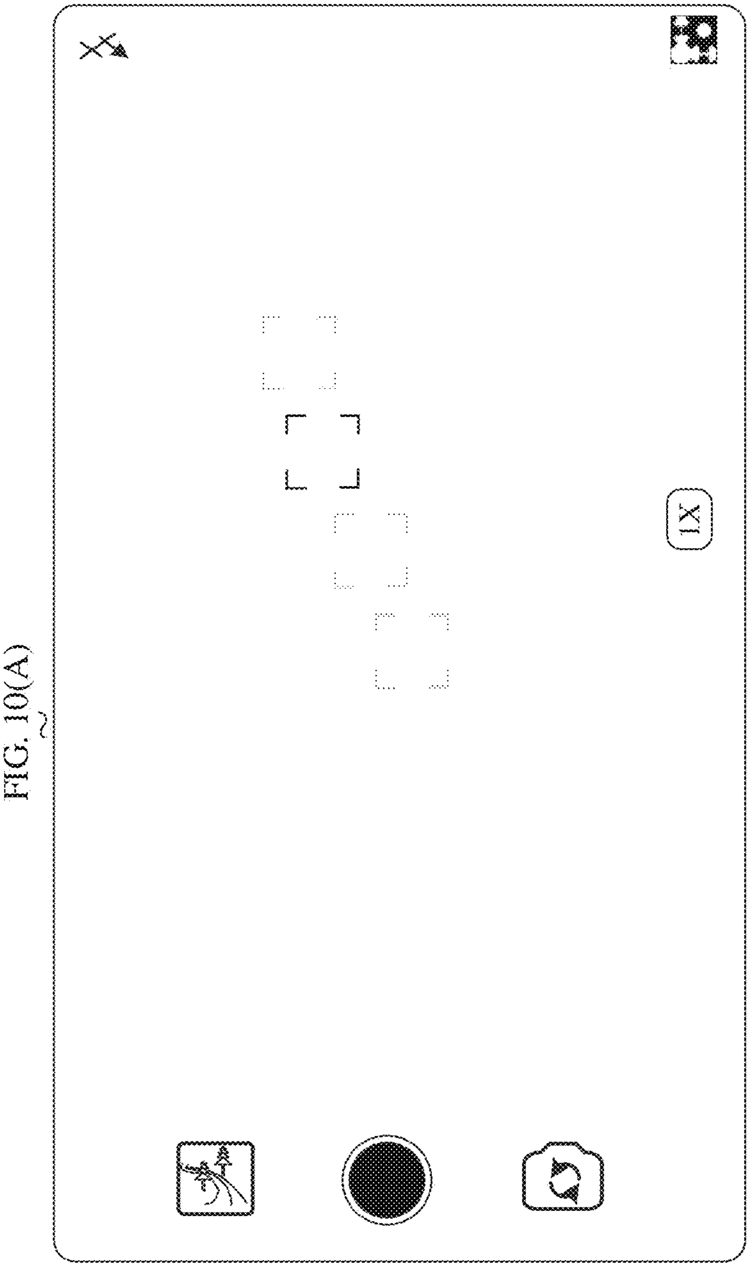
Figure 10C:
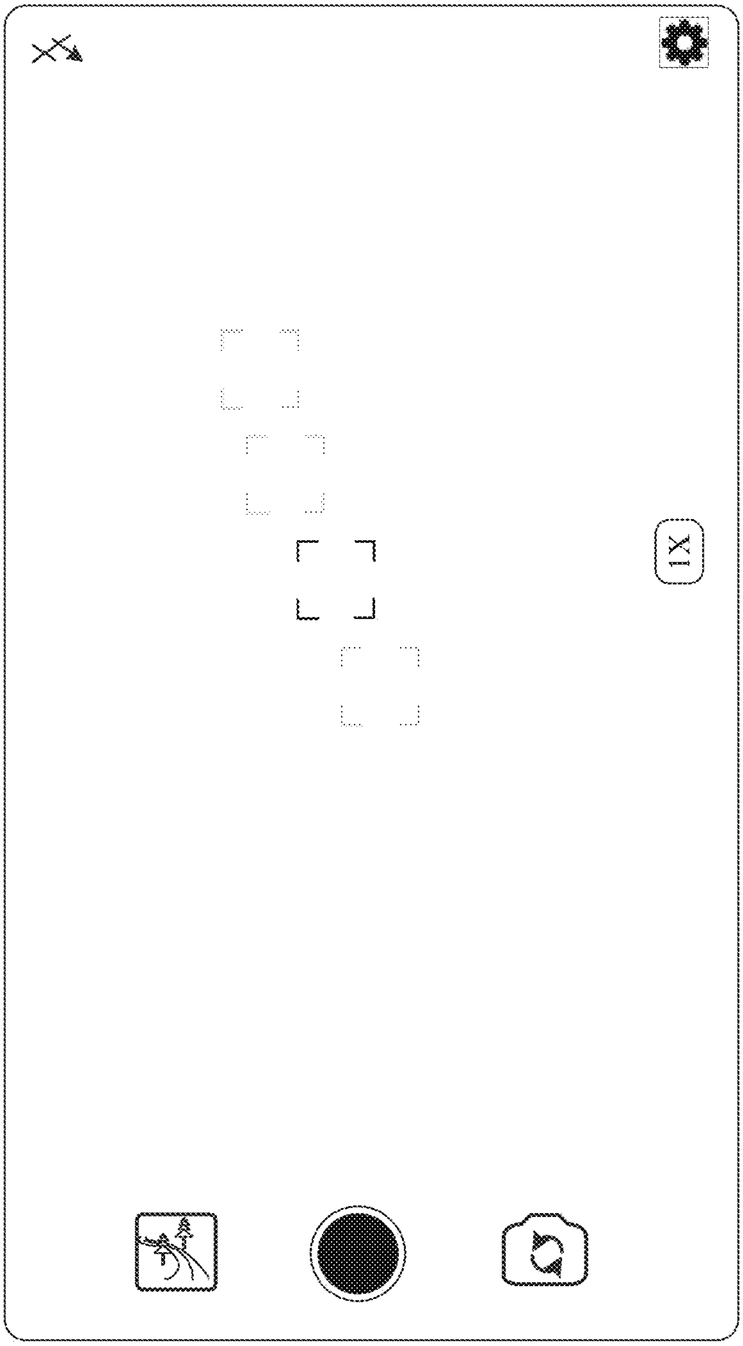
Figure 10D:
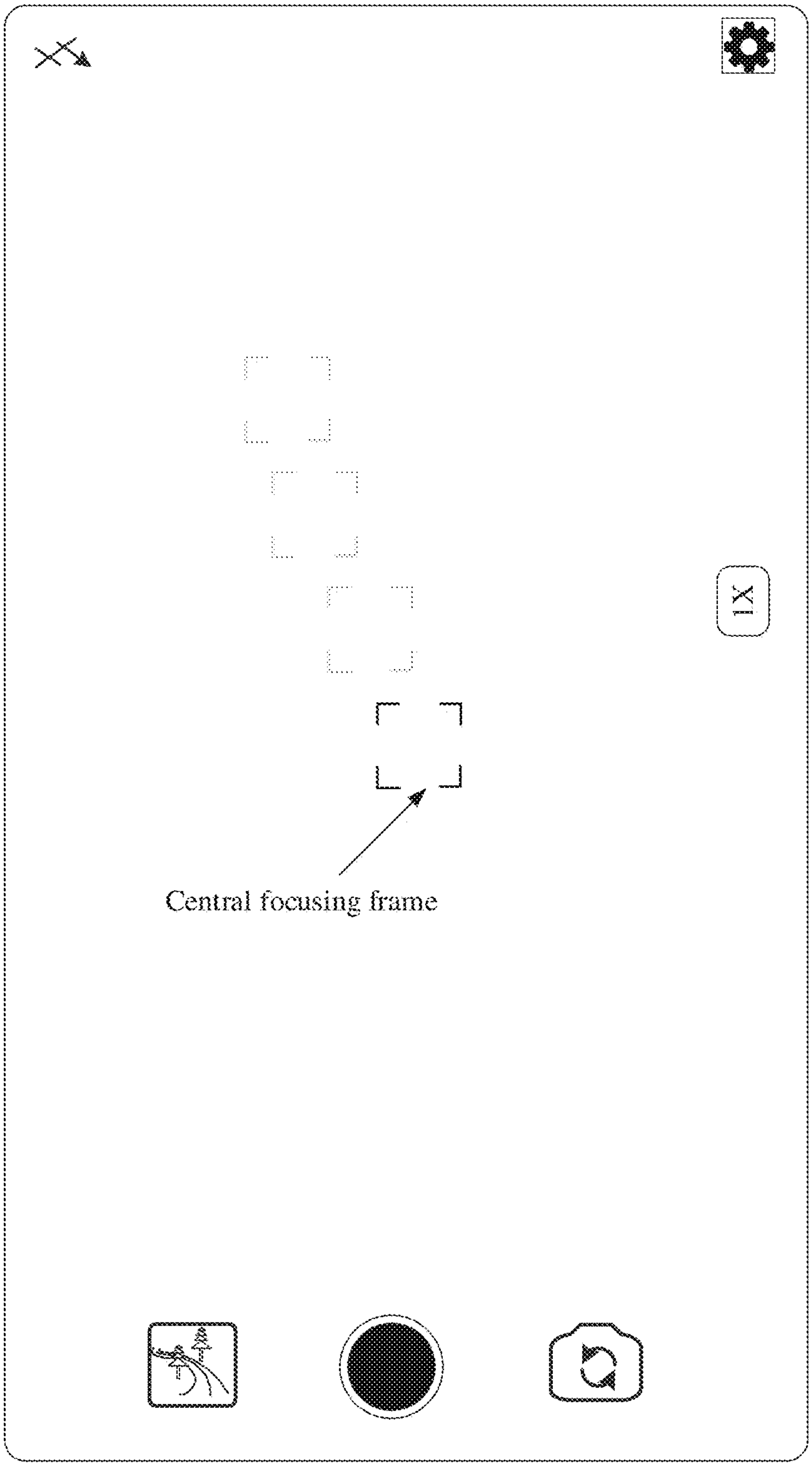

FIG. 9(A) and FIG. 9(B) are a schematic diagram of a group of focusing preview interfaces. After a user operation in FIG. 1(A) is performed, a user interface shown in FIG. 9(A) may be obtained. For descriptions in FIG. 9(A) and FIG. 9(B), refer to descriptions in FIG. 1(B). Details are not described again. As shown in FIG. 9(A), an electronic device may focus on a face. When the electronic device determines to exit the face focusing frame, a focusing frame may be moved to a location of a central focusing frame. The central focusing frame is located at a geometric center of a viewfinder frame in the focusing frame.

In an entire process of exiting the face focusing frame, the face focusing frame is moved to the location of the central focusing frame at one time, to complete an exit from the face focusing frame. In this way, when a distance from the current face focusing frame to the central focusing frame is long, if movement is performed for one time, a location of the focusing frame jumps obviously, and user experience is poor.

In view of the foregoing implementation, this embodiment of this application provides a focusing manner: The electronic device may determine the distance between the current face focusing frame and the central focusing frame when the electronic device needs to exit the face focusing frame. When the distance is greater than a specified value, the face focusing frame may be moved to the central focusing frame at a plurality of times; and when the distance is less than the specified value, the face focusing frame may be moved to the central focusing frame at one time.

In a possible implementation, the electronic device may move the face focusing frame to the central focusing frame at a plurality of times.

FIG. 10(A), FIG. 10(B), FIG. 10(C), and FIG. 10(D) are a schematic diagram of a group of focusing preview interfaces. After the user operation in FIG. 1(A) is performed, a user interface shown in FIG. 10(A) may be obtained. For descriptions in FIG. 10(A), FIG. 10(B), FIG. 10(C), and FIG. 10(D), refer to descriptions in FIG. 1(B). Details are not described again. When the face is displayed in the viewfinder frame, the face may be focused on. When determining that the electronic device needs to exit the face focusing frame, the electronic device may move a location of the current face focusing frame to the central focusing frame. As shown in FIG. 10(A), FIG. 10(B), FIG. 10(C), and FIG. 10(D), the focusing frame is moved to the central focusing frame at a total of three times, a direction of movement performed each time is a direction close to the central focusing frame.

It should be noted that the quantity of movement times is merely described as an example, and does not constitute a limitation.

In another possible implementation, the electronic device may move the face focusing frame to the central focusing frame at one time.

When the distance between the face focusing frame and the central focusing frame is less than the specified value, the face focusing frame may be directly moved to the central focusing frame. For a specific implementation, refer to the implementation in FIG. 9(A) and FIG. 9(B). Details are not described again.

In the foregoing implementations, when the electronic device exits the focusing frame, the focusing frame can be smoothly moved, and a quantity of cases in which the location of the focusing frame jumps can be reduced, thereby improving user experience.

It should be noted that the process of exiting the face focusing frame is a process of smoothly moving the location of the focusing frame, and this embodiment is applicable to any scenario in which the focusing frame is moved.

The following describes an electronic device in embodiments of this application.

Figure 11:
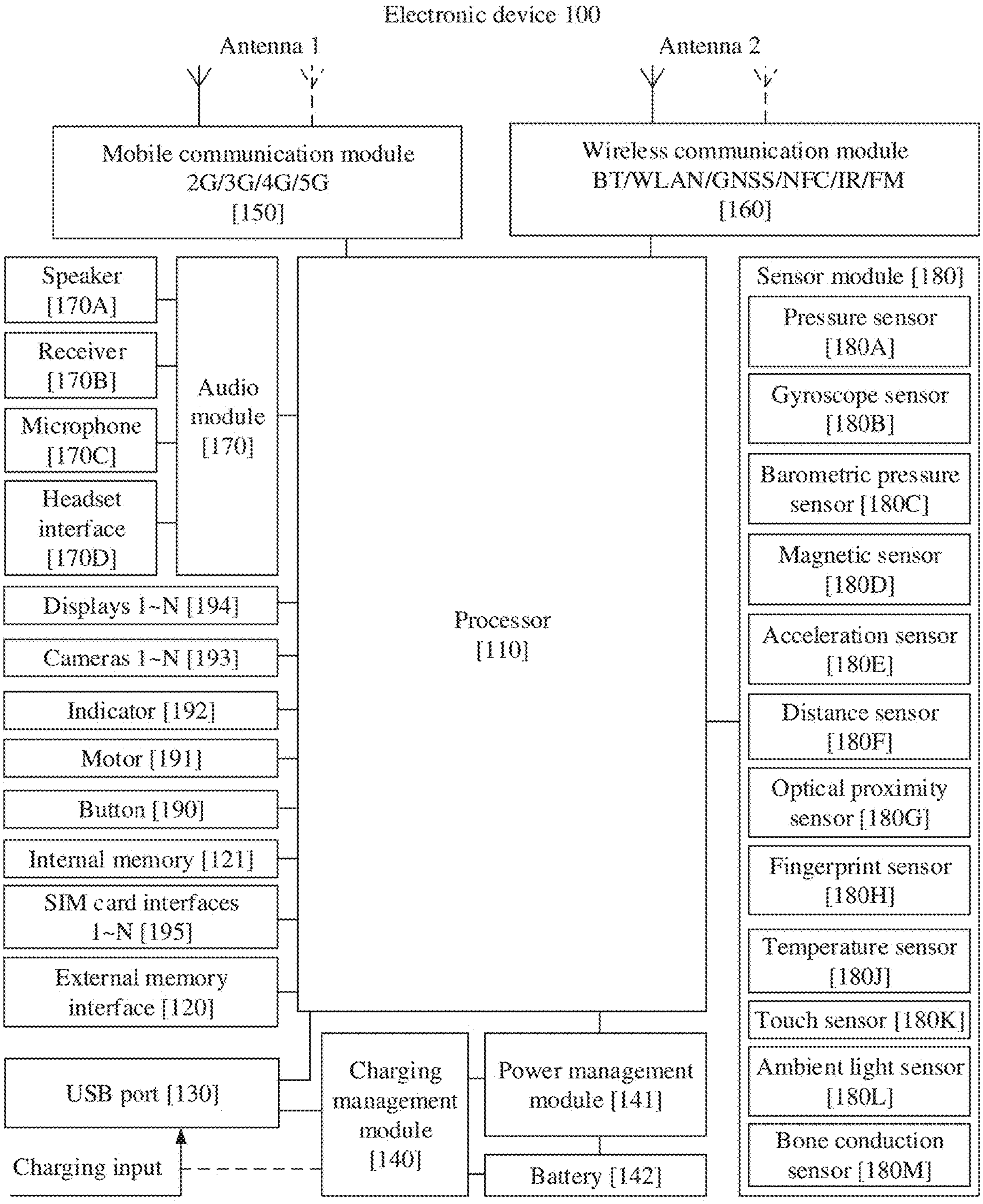
FIG. 11 is a schematic diagram of a structure of an electronic device 100 according to an embodiment of this application.

FIG. 11 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, and complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor 110 may directly invoke the instructions or the data from the memory. In this case, repeated access is avoided, a waiting time period of the processor 110 is reduced, and efficiency of a system is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) port, and/or the like.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication, to sample, quantize, and encode an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to perform the function of answering a call through the Bluetooth headset. Both the I2S interface and the PCM interface may be used for audio communication.

The UART interface is a universal serial data bus, and is configured to perform asynchronous communication. The bus may be a bidirectional communication bus. The bus converts to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 and peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type C port, or the like. The USB port 130 may be configured to be connected to the charger to charge the electronic device 100, or may be configured to transmit data between the electronic device 100 and a peripheral device, or may be configured to be connected to a headset, to play audio by using the headset. The interface may be further configured to be connected to another electronic device, for example, an AR device.

It may be understood that an interface connection relationship between modules illustrated in this embodiment of the present invention is merely an example for description, and does not constitute a limitation on the structure of the electronic device 100. In some other embodiments of this application, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. While charging the battery 142, the charging management module 140 may further supply power to the electronic device by using the power management module 141.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, or the like. The power management module 141 may be further configured to monitor parameters such as a battery capacity, a quantity of battery cycles, and a battery health status (for example, leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using an antenna 1, an antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, at least one switch, at least one power amplifier, at least one low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium or high frequency signal. The demodulator is configured to demodulate a received electromagnetic wave signal into a low frequency baseband signal. Then, the demodulator transfers, to the baseband processor for processing, the low-frequency baseband signal obtained through demodulation. The low-frequency baseband signal is processed by the baseband processor and then transferred to the application processor. The application processor outputs a sound signal through an audio device (which is not limited to the speaker 170A, the receiver 170B, and the like), or displays an image or a video by using the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like that is applied to the electronic device 100. The wireless communication module 160 may be one or more components integrating at least one communication processing module. The wireless communication module 160 receives an electromagnetic wave through the antenna 2, modulates and filters an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N displays 194, where N is a positive integer greater than 1.

The electronic device 100 may implement a collection function by using the ISP, the camera 193, the video codec, the GPU, the display 194, the application processor, or the like, to implement an image collection module of a HAL layer in this embodiment of this application.

The ISP is configured to process data fed back by the camera 193. For example, when photographing, a shutter is enabled, light is transmitted to a camera photosensitive element through a lens, an optical signal is converted into an electrical signal, and the camera photosensitive element transfers the electrical signal to the ISP for processing, to convert the electrical signal into an image or a video visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image or video signal. The ISP outputs the digital image or video signal to the DSP for processing. The DSP converts the digital image or video signal into an image or video signal in a standard format, for example, RGB or YUV. In some embodiments, the electronic device 100 may include 1 or N cameras 193, where N is a positive integer greater than 1. The camera may include a lens, a focus motor, and an image sensor (namely, the camera photosensitive element), and the focus motor may push the lens to adjust focusing.

The digital signal processor is configured to process a digital signal, and may process another digital signal in addition to the digital image or video signal. For example, when the electronic device 100 selects a frequency, the digital signal processor is configured to perform Fourier transform, or the like on energy of the frequency.

The video codec is configured to compress or decompress a digital video. The electronic device 100 may support one or more video codecs. Therefore, the electronic device 100 may play or record videos in a plurality of encoding formats such as moving picture experts group (moving picture experts group, MPEG) 1, MPEG2, MPEG3, and MPEG4.

The NPU is a neural-network (neural-network, NN) computing processor. By referring to a structure of a biological neural network, for example, a transfer mode between human brain neurons, the NPU quickly processes input information, and may further perform continuously perform self-learning. The NPU may be used to implement applications such as intelligent cognition of the electronic device 100, for example, image recognition, facial recognition, voice recognition, and text understanding.

The external memory interface 120 may be configured to be connected to an external storage card, for example, a Micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, where the executable program code includes instructions. The processor 110 runs the instructions stored in the internal memory 121, to execute various function applications and data processing of the electronic device 100. The internal memory 121 may include a program storage area and a data storage area. The program storage area may store an operating system, an application required by at least one function (for example, a sound playing function or an image or video playing function), and the like. The data storage area may store data (for example, audio data or an address book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending audio information, a user may make a sound near the microphone 170C through the mouth of the user, to enter a sound signal into the microphone 170C. The electronic device 100 may set at least one microphone 170C. In some other embodiments, the electronic device 100 may be provided with two microphones 170C, to implement a noise reduction function in addition to collecting a sound signal. In some other embodiments, the electronic device 100 may alternatively be provided with three, four, or more microphones 170C, to collect a sound signal, implement noise reduction, and identify a sound source, so as to implement a directional recording function, and the like.

The headset jack 170D is configured to be connected to a wired headset. The headset jack 170D may be a USB port 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed a Messaging application icon, an instruction for viewing an SMS message is executed. For example, when a touch operation whose touch operation intensity is greater than or equal to the first pressure threshold is performed on the Messaging application icon, an instruction for creating a new SMS message is executed.

The gyroscope sensor 180B may be configured to determine a moving posture of the electronic device 100. In some embodiments, an angular velocity of the electronic device 100 around three axes (that is, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a flip phone, the electronic device 100 may detect opening and closing of a flip cover based on the magnetic sensor 180D, and further set features such as automatic unlocking of the flip cover based on a detected opening and closing state of the leather case or opening and a detected opening and closing state of the flip cover.

The acceleration sensor 180E may detect an acceleration value of the electronic device 100 in various directions (usually on three axes). When the electronic device 100 is still, a magnitude and a direction of gravity may be detected. The acceleration sensor 180E may be further configured to recognize a posture of the electronic device, and is applied to applications such as switching between landscape mode and a portrait mode and a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 uses a photodiode to detect infrared reflected light from a nearby object. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power storing. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when a temperature reported by the temperature sensor 180J exceeds a threshold, the electronic device 100 lowers performance of a processor located near the temperature sensor 180J, to reduce power consumption for thermal protection. In some other embodiments, when the temperature is lower than another threshold, the electronic device 100 heats the battery 142, to prevent the electronic device 100 from being shut down abnormally due to a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor, to determine a type of a touch event. The display 194 may be configured to provide a visual output related to the touch operation. In some other embodiments, the touch sensor 180K may alternatively be disposed on a surface of the electronic device 100, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a pulse of a human body, to receive a blood pressure beating signal. In some embodiments, the bone conduction sensor 180M may alternatively be disposed in a headset, to be combined into a bone conduction headset. The audio module 170 may obtain a speech signal through parsing based on the vibration signal, of the vibration bone of the vocal-cord part, that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, receiving information, an alarm clock, and a game) may also correspond to different vibration feedback effects. A touch vibration feedback effect may alternatively be customized.

The indicator 192 may be an indicator light, and may be used to indicate a charging status or a power change, or may be used to indicate a message, a missed call, a notification, or the like.

The SIM card interface 195 is configured to be connected to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a Nano SIM card, a Micro SIM card, a SIM card, and the like. A plurality of cards may be inserted into a same SIM card interface 195 at a same time. The plurality of cards may be of a same type or different types. The SIM card interface 195 may be further compatible with SIM cards of different types. The SIM card interface 195 may be further compatible with the external memory card. The electronic device 100 interacts with a network by using the SIM card, to implement functions such as conversation and data communication. In some embodiments, an eSIM, namely, an embedded SIM card, is used for the electronic device 100. The eSIM card may be embedded into the electronic device 100, and cannot be separated from the electronic device 100.

A layered architecture, an event-driven architecture, a microcore architecture, a microservice architecture, or a cloud architecture may be used for a software system of the electronic device 100. In this embodiment of the present invention, an Android system with a layered architecture is used as an example to describe a software structure of the electronic device 100.

Figure 12:
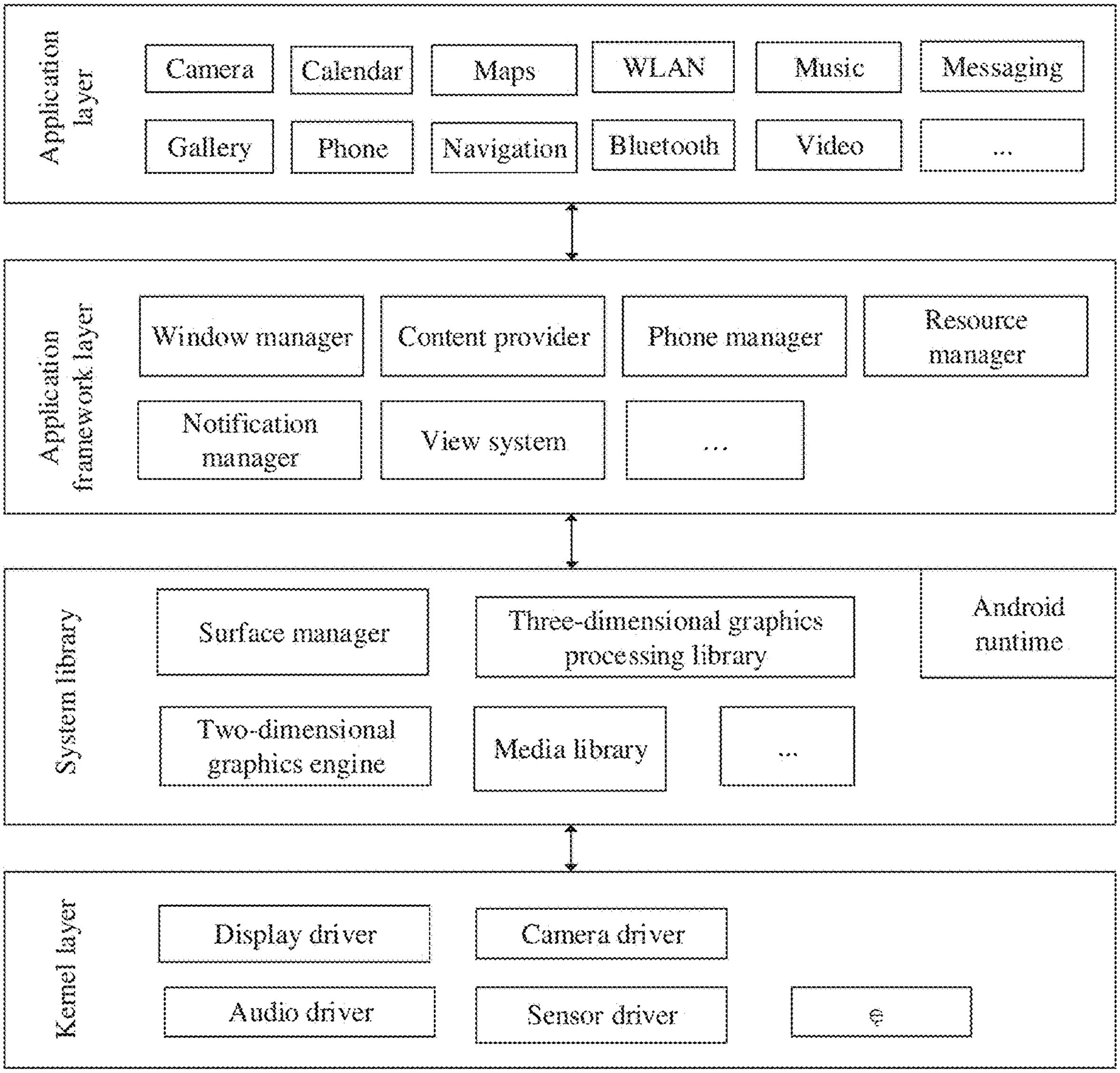
FIG. 12 is a block diagram of a software structure of an electronic device 100 according to an embodiment of this application.

FIG. 12 is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers, and the four layers are respectively an application layer, an application framework layer, an Android runtime (Android runtime) and system library layer, and a kernel layer from top to bottom.

The application layer may include a series of application packages.

As shown in FIG. 12, the application packages may include applications such as Camera, Gallery, Calendar, Phone, Maps, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 12, the application framework layer may include a window manager, a content provider, a view system, a phone manager, a resource manager, a notification manager, and the like.

The window manager is configured to manage a window program. The window manager may obtain a size of a display, and determine whether there is a status bar, a lock screen, a screen capture, or the like.

The content provider is configured to store and obtain data, so that the data can be accessed by an application. The data may include a video, an image, audio, a made call, an answered call, a browsing history and bookmark, a phonebook, and the like.

The view system includes a visual control, for example, a control for displaying a text, or a control for displaying a picture. The view system may be configured to construct an application. A display interface may include one or more views. For example, a display interface including an SMS message notification icon may include a view for displaying a text and a view for displaying a picture.

The phone manager is configured to provide a communication function of the electronic device 100, for example, management of a call status (including an answered state, a declined state, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to: notify that downloading is completed, or prompt a message. The notification manager may alternatively be a notification that appears in a top status bar of the system in a form of a graph or a scroll bar text, for example, a notification of an application running in the background or a notification that appears on a screen in a form of a dialog window. For example, text information is prompted in the status bar, a prompt tone is produced, the electronic device vibrates, or an indicator blinks.

Android runtime includes a kernel library and a virtual machine. The Android runtime is responsible for scheduling and management of the Android system.

The core library includes two parts: One part is a function that needs to be called in java language, and the other part is a core library of Android.

The application layer and the application framework layer run on the virtual machine. The virtual machine converts a java file at the application layer and the application framework layer into a binary file for execution. The virtual machine is configured to perform functions such as object lifecycle management, stack management, thread management, security and abnormality management, and garbage collection.

The system library may include a plurality of functional modules such as a surface manager (surface manager), a media library (Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording of a plurality of common audio and video formats, a still image file, and the like. The media library may support a plurality of audio and video encoding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which focusing and photographing are performed, the following describes an example of a working procedure of software and hardware of an electronic device 100.

When a camera driver determines that a focusing frame needs to be adjusted, corresponding hardware may be driven to adjust a focusing situation. When a size and/or a location of the focusing frame needs to be adjusted, the camera drive may drive a focus motor, and the focus motor may push a lens to a corresponding location.

Figure 13:
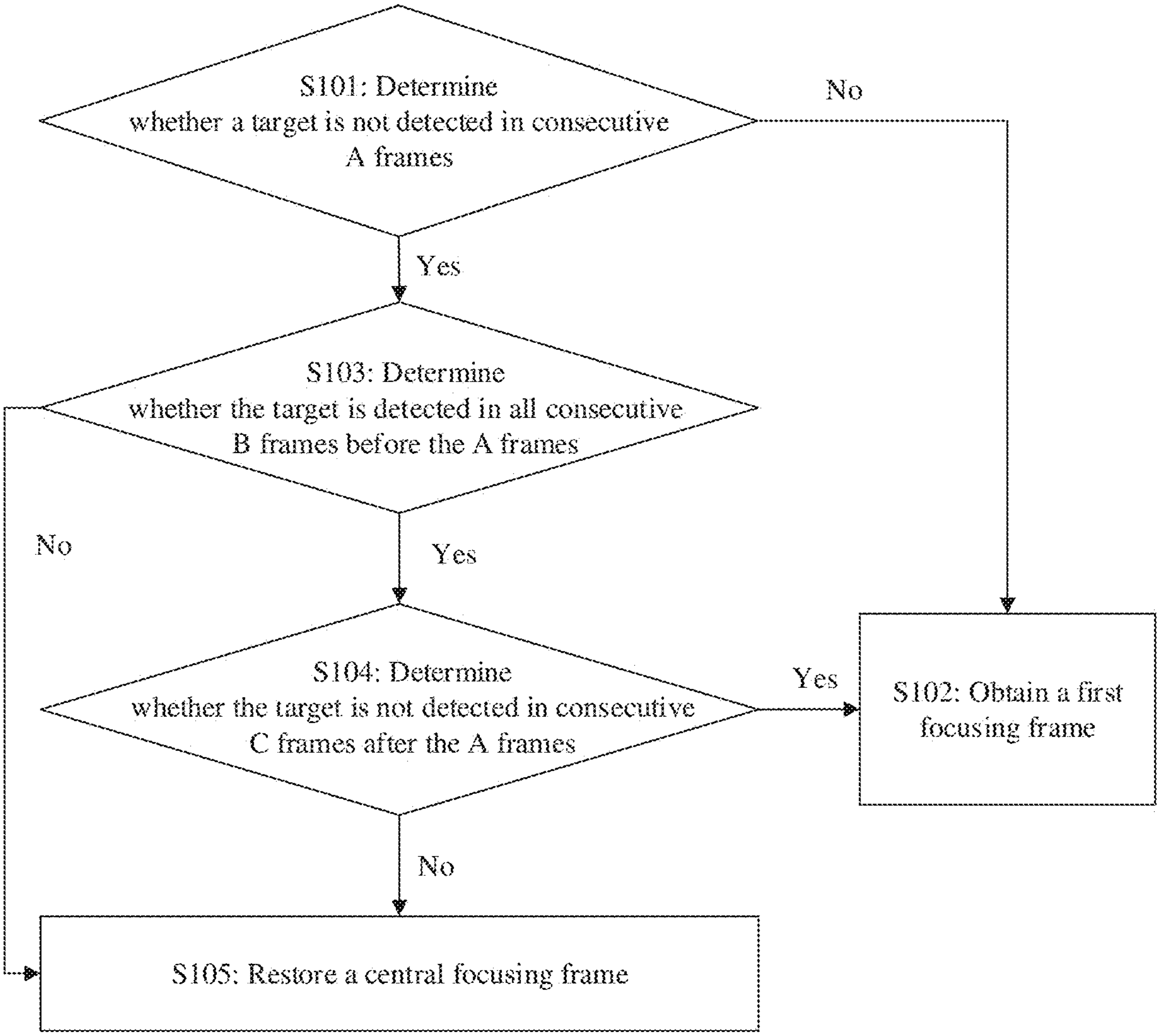
FIG. 13 is a schematic flowchart of a focusing method according to an embodiment of this application.

FIG. 13 is a schematic flowchart of a focusing method according to an embodiment of this application. As shown in FIG. 13, the focusing method includes steps S101 to S105:

In this embodiment of this application, whether to exit a first focusing frame is determined based on a size and a location of a focusing frame in several consecutive frames, to improve a condition of exiting the focusing frame, so as to delay an exit from the focusing frame.

S101: An electronic device determines whether a target is not detected in consecutive A frames. Step S102 is performed if the target is not detected in the consecutive A frames; and step S103 is performed if the target is detected in any one of the consecutive A frames.

The target is a focused object in a preview image. For example, the target is a face. The preview image may be a preview image existing when the electronic device performs photographing. A is a positive integer, and a range of A may be from 3 to 20. Preferably, A is 8.

The electronic device may determine, based on a size and/or a location of a target bounding box, whether the target can be detected.

Implementation 1: The electronic device may determine whether the size of the target bounding box is less than a first threshold. If the size of the target bounding box is less than the first threshold, the target is not detected.

The target bounding box may be a face bounding box, an object box, an animal frame, or the like. The size of the target bounding box is a pixel value of a focused part. The first threshold is (M*N), a range of M is from 10 to 50, and a range of N is from 10 to 50. Preferably, the first threshold is 30*30. For example, when the size of the target bounding box is 20*20 and the first threshold is 30*30, it is determined that 20 is less than 30, and it may be determined that the target bounding box does not exist in the preview image.

As shown in (A) and (B) in FIG. 5, when a person is further away from a camera, the target bounding box becomes smaller, and when the size of the target bounding box is less than the first threshold 30*30, it may be determined that the target is not detected.

Implementation 2: The electronic device may determine whether a center of the target bounding box falls within an edge range of the preview image, and if the center of the target bounding box falls within the edge range of the preview image, the target is not detected.

Figure 14:
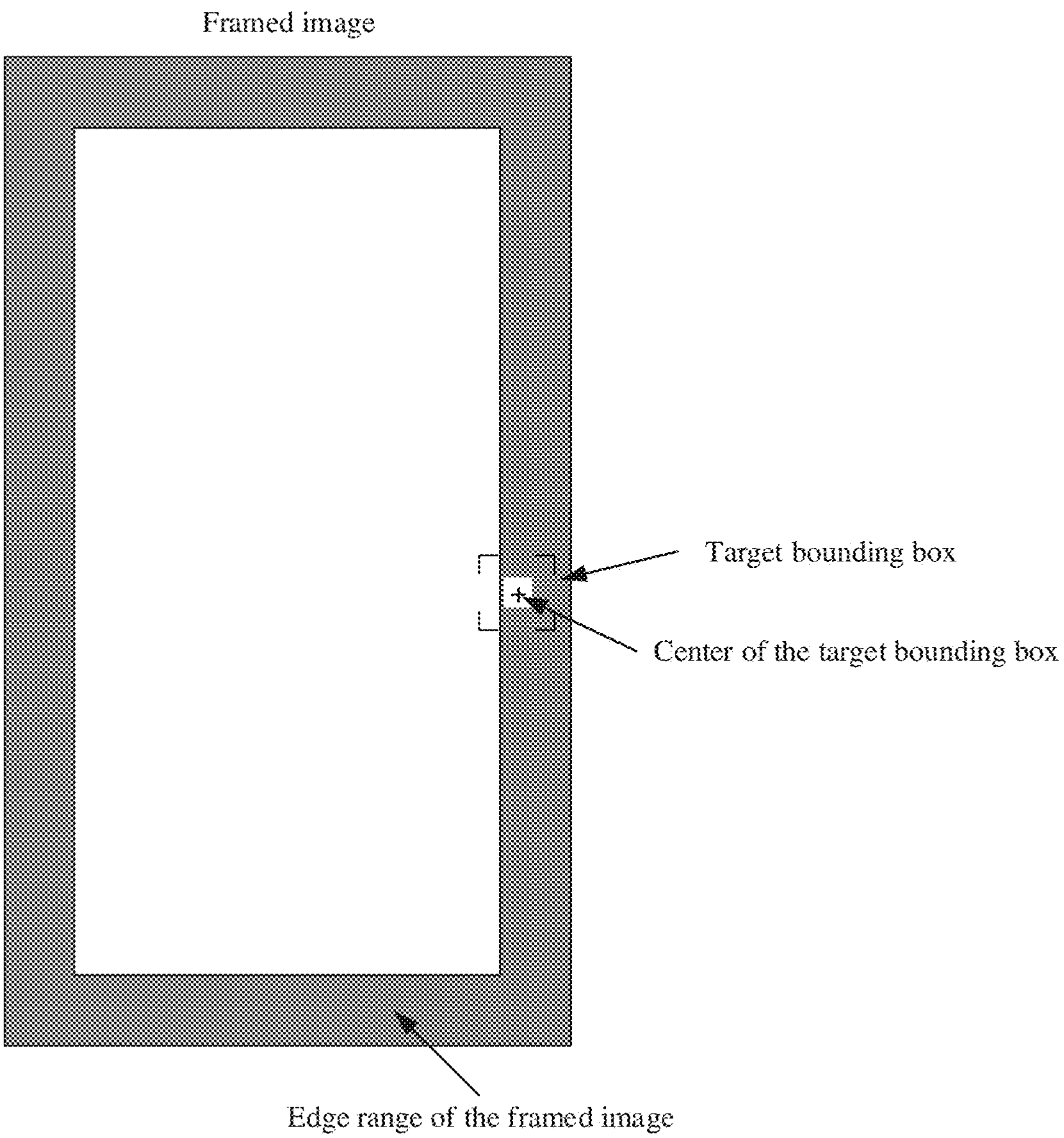
FIG. 14 is a schematic diagram of a focusing preview interface according to an embodiment of this application.

FIG. 14 is a schematic diagram of a focusing preview interface according to an embodiment of this application. As shown in FIG. 14, the center of the target bounding box is a geometric center of the target bounding box. The edge range (gray portion) of the preview image may be an edge part of the preview image. When the center of the target bounding box falls within the edge range of the preview image, it may be determined that the target bounding box does not exist in the preview image. The edge range of the preview image may be a part including 20 pixels within a viewfinder frame, or may be an edge range having another pixel value away from the viewfinder frame. This is not limited. For details, refer to descriptions in (A) and (B) in FIG. 6. The details are not described again.

It should be noted that whether the size and/or the location of the target bounding box meet/meets a preset condition may be determined by using one or two of the foregoing implementations. When the two implementations are used, only when neither of the two conditions is met, it can be determined that the target is detected; and when either of the two conditions is met, the target is not detected. An execution sequence of the two implementations is not limited. The size of the target bounding box may be determined before the location of the target bounding box is determined, or the location of the target bounding box may be determined before the size of the target bounding box is determined.

S102: The electronic device obtains the first focusing frame.

The electronic device may obtain the first focusing frame. In other words, the electronic device may focus on the target.

It should be understood that, in this case, the electronic device may focus on the target, and the formed first focusing frame may or may not be displayed. This is not limited herein.

S103: The electronic device determines whether the target is detected in all consecutive B frames before the A frames. Step S104 is performed if the target is detected in all consecutive B frames before the A frames; and step S105 is performed if the target is not detected in all the consecutive B frames before the A frames.

B is a positive integer, and a value range of B may be from 1 to 8. Preferably, B is 3. For example, A=8, and B=3. When the target is not detected in eight frames of preview images, the electronic device may determine three frames before the eight frames. Step S104 is performed if the target is detected in the three frames; and step S102 is performed if the target is not detected in at least one of the three frames.

S104: The electronic device determines whether the target is not detected in consecutive C frames after the A frames, and performs step S105 if the target is not detected in the consecutive C frames after the A frames; or performs step S102 if the target is detected in any one of consecutive C frames after the A frames.

C is a positive integer, and a value range of C may be from 1 to 8. Preferably, C is 3 or 5.

Figure 15:
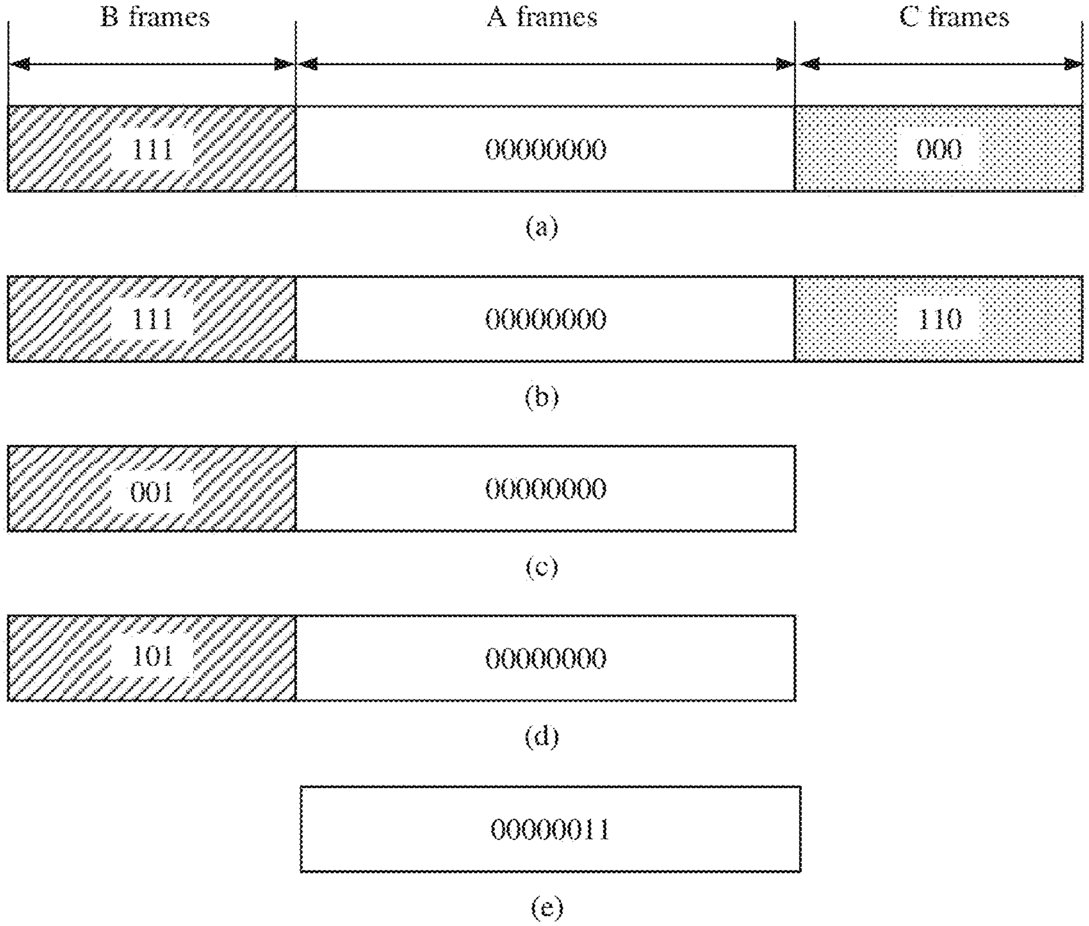
FIG. 15 is a schematic diagram of a focusing situation of a group of a plurality of consecutive frames of preview images according to an embodiment of this application.

FIG. 15 is a schematic diagram of a focusing situation of a group of a plurality of consecutive frames of preview images. As shown in FIG. 15, A is 8, B and C each are 3, 1 indicates that the target is detected in one frame of preview image, and 0 indicates that the target is not detected in one frame of preview image. First, the electronic device may determine whether all the consecutive A frames are 0, and further determine B frames if all the consecutive A frames are 0; or perform step S102 if all the consecutive A frames are not 0. Herein, all consecutive 8 frames in each of (a), (b), (c), and (d) in FIG. 15 are 0, and last two frames in A frames in (e) are 0. Therefore, the first focusing frame is obtained in (e). Then, the electronic device determines whether all consecutive B frames are 1, and further determines C frames if all the consecutive B frames are 1; or performs step S105 if all the consecutive B frames are not 1. In FIG. 15, all three consecutive frames (B frames) in each of (a) and (b) are 1, and all three consecutive frames (B frames) in each of (c) and (d) are not 1. Therefore, C frames in (a) and (b) are determined, and the central focusing frame is restored in (a) and (b). Finally, the electronic device determines whether all the consecutive C frames in each of (a) and (b) are 0, and performs step S105 if all the consecutive C frames in each of (a) and (b) are not 0; or performs step S102 if all the consecutive C frames in each of (a) and (b) are not 0. All three frames in (a) are 0, and the central focusing frame is restored in (a). All three frames in (b) are not 0, and the first focusing frame is obtained in (b).

S105: The electronic device restores the central focusing frame.

The electronic device may move the first focusing frame to the central focusing frame. For a detailed description, refer to descriptions in FIG. 9(A) and FIG. 9(B) and FIG. 10(A), FIG. 10(B), FIG. 10(C), and FIG. 10(D). Details are not described again.

Figure 16:
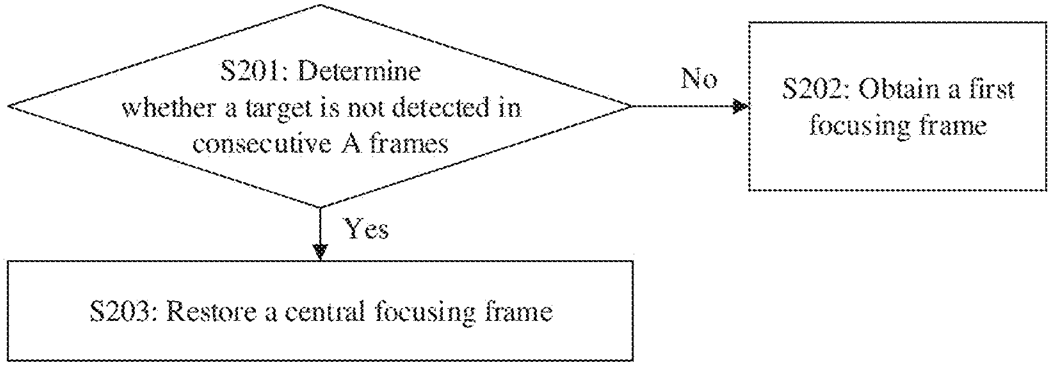
FIG. 16 is a schematic flowchart of another focusing method according to an embodiment of this application.

FIG. 16 is a schematic flowchart of another focusing method according to an embodiment of this application. As shown in FIG. 16, the focusing method includes steps S201 to S203:

S201: An electronic device determines whether a target is not detected in consecutive A frames. Step S202 is performed if the target is not detected in the consecutive A frames; and step S203 is performed if the target is detected in any one of the consecutive A frames.

For descriptions in step S201, refer to related descriptions in step S101. Details are not described again.

S202: The electronic device obtains a first focusing frame.

For descriptions in step S202, refer to related descriptions in step S102. Details are not described again.

S203: The electronic device restores a central focusing frame.

For descriptions in step S203, refer to related descriptions in step S105. Details are not described again.

Figure 17:
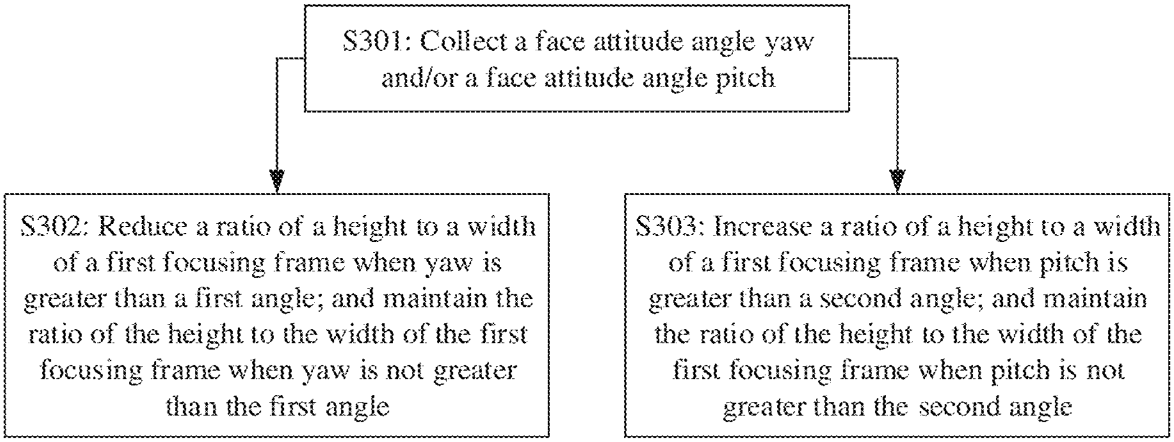
FIG. 17 is a schematic flowchart of still another focusing method according to an embodiment of this application.

FIG. 17 is a schematic flowchart of still another focusing method according to an embodiment of this application. As shown in FIG. 17, the focusing method includes steps S301 to S303.

In this embodiment of the application, a size of a focusing frame is adjusted based on rotation of a face attitude angle in a focusing frame. An electronic device adjusts a height in an up and down direction of a first focusing frame based on a face attitude angle of rotating in an up and down rotation of an attitude angle, and/or adjusts a width in a left and right direction of the first focusing frame based on a face attitude angle of rotating in a left and right rotation of the attitude angle.

S301: The electronic device collects a face attitude angle yaw and/or a face attitude angle pitch.

When the first focusing frame is a face focusing frame, the face attitude angle is collected. The face attitude angle may include an angle yaw and/or an angle pitch at which the head of a person rotates.

Figure 18:
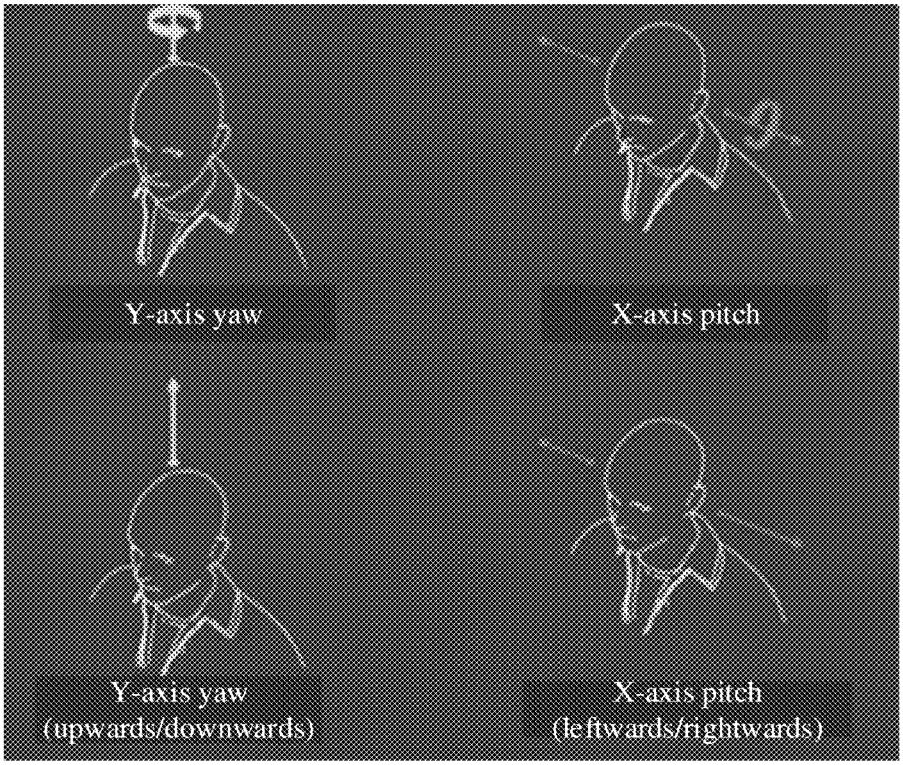
FIG. 18 is a schematic diagram of still another attitude angle existing when a face rotates according to an embodiment of this application.

FIG. 18 is a schematic diagram of an attitude angle existing when a face turns. As shown in FIG. 18, when the person stands upright and a front face of the head of the person faces the first focusing frame, a vertical downward direction is a Y-axis, and a horizontal direction is an X-axis. The face attitude angle yaw is an angle at which the head of the person rotates in an up and down direction. An angle at which the head of the person rotates (to be specific, the head shakes or turns) along the Y-axis is a degree of yaw. The face attitude angle pitch is an angle at which the head of the person rotates leftwards/rightwards. An angle at which the head of the person rotates (to be specific, the person nods the head, lowers the head, looks up, raises the head, or the like) along the X-axis is a degree of pitch.

The electronic device may determine yaw and pitch in a face attitude estimation method.

For example, the electronic device may estimate 3D (three dimensional) attitude information (a face attitude angle in three-dimensional space) based on 2D (two dimensional) calibration information (to be specific, two-dimensional image data of a preview image). For example, a key point (for example, an eye, a nose, or a face contour) of the face may be calculated based on the image data of the preview image, and then a reference system (that is, a key point existing when the front face of the person is in the preview image) is selected, to calculate a transformation matrix of the key point and the reference system, and estimate the face attitude angle yaw and the face attitude angle pitch through iteration. It should be understood that yaw and pitch may be determined in another manner. This is not limited.

S302: Reduce a ratio of a height to a width of the first focusing frame when yaw is greater than a first angle; and maintain the ratio of a height to the width of the first focusing frame when yaw is not greater than a first angle.

The first angle may be a preset angle, and a range of the first angle is from 25 degrees to 45 degrees. Preferably, the first angle is 30 degrees, the height of the first focusing frame is a length of the first focusing frame in a vertical direction, and the width of the first focusing frame is a length of the first focusing frame in a horizontal direction.

When the electronic device measures that an angle at which the person lowers the head or looks up reaches a specific angle, a length of the face in the vertical direction in the preview image is reduced, to reduce a length of the face focusing frame in the vertical direction. The electronic device may be reduced in a specific proportion, or may be reduced based on a specific length. For details, refer to descriptions in FIG. 8(A) and FIG. 8(B).

S303: Reduce a ratio of a height to a width of the first focusing frame when pitch is greater than a second angle; and maintain the ratio of the height to the width of the first focusing frame when pitch is not greater than the second angle.

The second angle may also be a preset angle, and a range of the second angle is from 25 degrees to 45 degrees. Preferably, the second angle is 30 degrees.

When the electronic device measures that an angle at which the head turns to one side reaches a specific angle, a length of the face in the horizontal direction in the preview image is reduced, to reduce a length of the face focusing frame in the horizontal direction. The electronic device may be reduced in a specific proportion, or may be reduced based on a specific length. For details, refer to descriptions in FIG. 8(C) and FIG. 8(D).

It should be understood that when the head of the person is deflected along the Y-axis and/or the X-axis, in other words, when the person lowers the head, looks up, or turns the head to a side, the face in the preview image is reduced or a proportion of the face in the image changes.

It should be noted that one or both of step S302 and step S303 may be included in this embodiment. When both are included, an execution sequence of step S302 and step S303 is not limited, step S302 may be performed before step S303, or step S303 may be performed before step S302.

It should be understood that, based on the foregoing descriptions, when the focusing frame of the electronic device is aligned with the face, the focusing frame may be adjusted based on a rotation situation of the face, so that the focusing frame accurately focus on a location of the face, thereby improving user experience.

Figure 19:
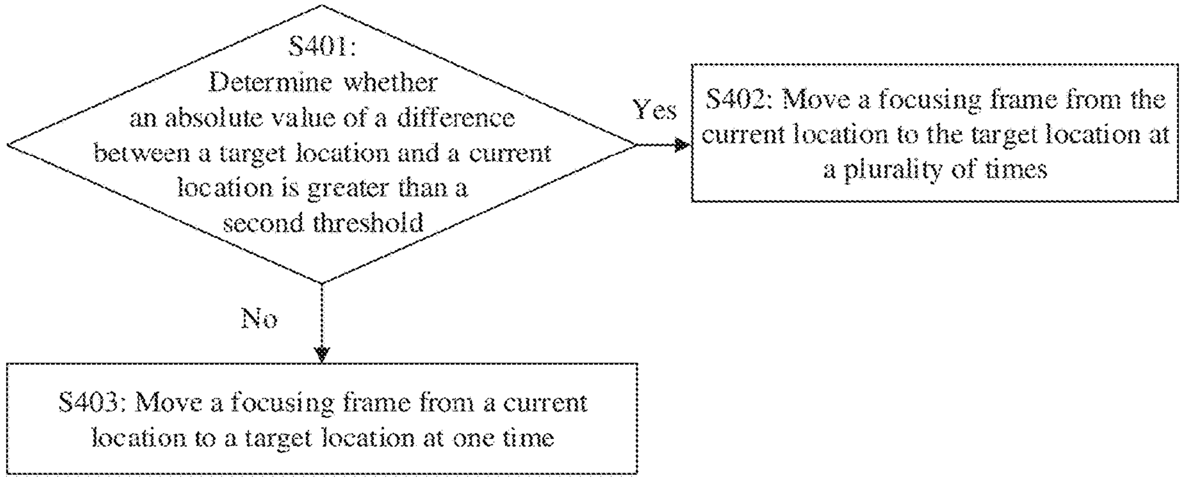
FIG. 19 is a schematic flowchart of yet another focusing method according to an embodiment of this application.

FIG. 19 is a schematic flowchart of yet another focusing method according to an embodiment of this application. As shown in FIG. 19, the focusing method includes steps S401 to S403.

In this embodiment, different manners of moving a focusing frame may be selected based on a current location of the focusing frame and a location of a target focusing frame. An electronic device may move the focusing frame for a plurality of times when a distance between the current location of the focusing frame and the location of the target focusing frame is long; and may move the focusing frame for one time when the distance is short.

S401: Determine whether an absolute value of a difference between a target location and the current location is greater than a second threshold. Step S402 is performed if the absolute value is greater than the second threshold; or step S403 is performed if the absolute value is not greater than the second threshold.

When a focusing frame in a preview image needs to be moved, the electronic device may determine a target location a and a current location b, and then may determine whether an absolute value of a difference between the target location and the current location is greater than a second threshold c, in other words, determine whether $|a-b|>c$.

The current location may be a motor location corresponding to a current focusing frame, and the target location may be a motor location corresponding to the target focusing frame to which the focusing frame needs to be moved. In this case, the second threshold may be 15 micrometers or 30 micrometers. This is not limited. Due to different cameras and different photographing scenarios, when a motor is pushed to a quasi-focusing location at one time, a current preview image and a previous preview image differ greatly, and user experience is poor. In some camera assemblies, the motor pushes a lens by a small distance, and a user perceives a jump in an image in a preview interface. In some other camera assemblies, the motor pushes the lens by a large distance, and the user perceives the jump in the image in the preview interface. Therefore, the second threshold needs to be specifically considered based on a device assembly.

S402: Move the focusing frame from the current location to the target location at a plurality of times.

The focusing frame is moved from the current location to the target location at the plurality of times. To be specific, the electronic device pushes the motor for a plurality of times, and the motor location of the focusing frame is moved from the current location for the plurality of times, until the motor location of the focusing frame arrives at the target location. For details, refer to related descriptions in FIG. 10(A), FIG. 10(B), FIG. 10(C), and FIG. 10(D).

In a possible implementation, the electronic device may determine, based on the target location, the current location, and a first step f, a quantity of times of pushing the motor and a distance by which the motor is pushed each time. The electronic device may determine a quantity of pushing times $$d = \left\lfloor \frac{|a-b|}{f} \right\rfloor.$$

Herein, $\lfloor\ \rfloor$ indicates rounding up. It can be understood that the electronic device may first push the motor based on the first step when a distance between the target location and the current location is greater than the first step, and directly push the motor to the target location when the distance between the motor location and the target location is less than the first step. A range of the first step is from 5 micrometers to 25 micrometers. Preferably, the first step is equal to the second threshold. For example, when a is 50 micrometers, b is 95 micrometers, and the first step f is 15 micrometers, d is (95−50)/15=3, and the electronic device pushes the motor for three times, and pushes the motor by 15 micrometers each time. When a is 100 micrometers, b is 155 micrometers, and the first step f is 15 micrometers, d is $\lfloor(155-100)/15\rfloor=4$. The electronic device pushes the motor for four times, pushes the motor by 15 micrometers each of first three times, and pushes the motor by (155−100)−3*15=10 micrometers at a last time.

In another possible implementation, the electronic device may determine, based on the target location a, the current location b, and the quantity d of times of pushing the motor, a distance l by which the motor is pushed each time. The quantity d of times of pushing the motor is $l=|a-b|/k$. In this case, the electronic device may push the motor for d times, and push the motor by l micrometers each time. For example, when a is 50 micrometers, b is 95 micrometers, and d is 15 micrometers, l is (95−50)/15−3, and the electronic device pushes the motor for three times, and pushes the motor by 15 micrometers each time.

It should be noted that the quantity d of times of pushing the motor needs to be a limited quantity, and the electronic device may reduce the quantity d of pushing times as much as possible when the user does not perceive a jump of the location of the focusing frame.

It should be understood that the motor is pushed for a plurality of times, so that the location of the focusing frame in the preview image is moved for the plurality of times. In this way, the user does not perceive a saltatory change in the location of the focusing frame, thereby improving user experience.

S403: Move the focusing frame from the current location to the target location at one time.

When the electronic device determines the target location a and the current location b, the motor may be directly pushed from the current location to the target location. For details, refer to related descriptions in FIG. 9(A) and FIG. 9(B). Details are not described herein again.

It should be noted that the target focusing frame may be a central focusing frame, and when an exit from the first focusing frame of the electronic device is made, the first focusing frame may be moved to the central focusing frame. The foregoing describes only one case in which the focusing frame is moved. This is not limited.

In steps S401 to 403, a process in which the electronic device exits the first focusing frame when the first focusing frame does not meet a preset condition is described. For example, an exit from the face focusing frame is made, and the central focusing frame is entered. The motor location may be sequentially moved for a plurality of times when a distance between the face focusing frame and a motor location corresponding to the central focusing frame is large; and the motor location may be adjusted for one time when a distance between the face focusing frame and a motor location corresponding to the central focusing frame is small. According to the method, it can be ensured that the focusing frame in the preview image is moved smoothly step by step. In this way, a human eye does not perceive a sudden change in the location of the focusing frame, thereby improving user experience.

Figure 20:
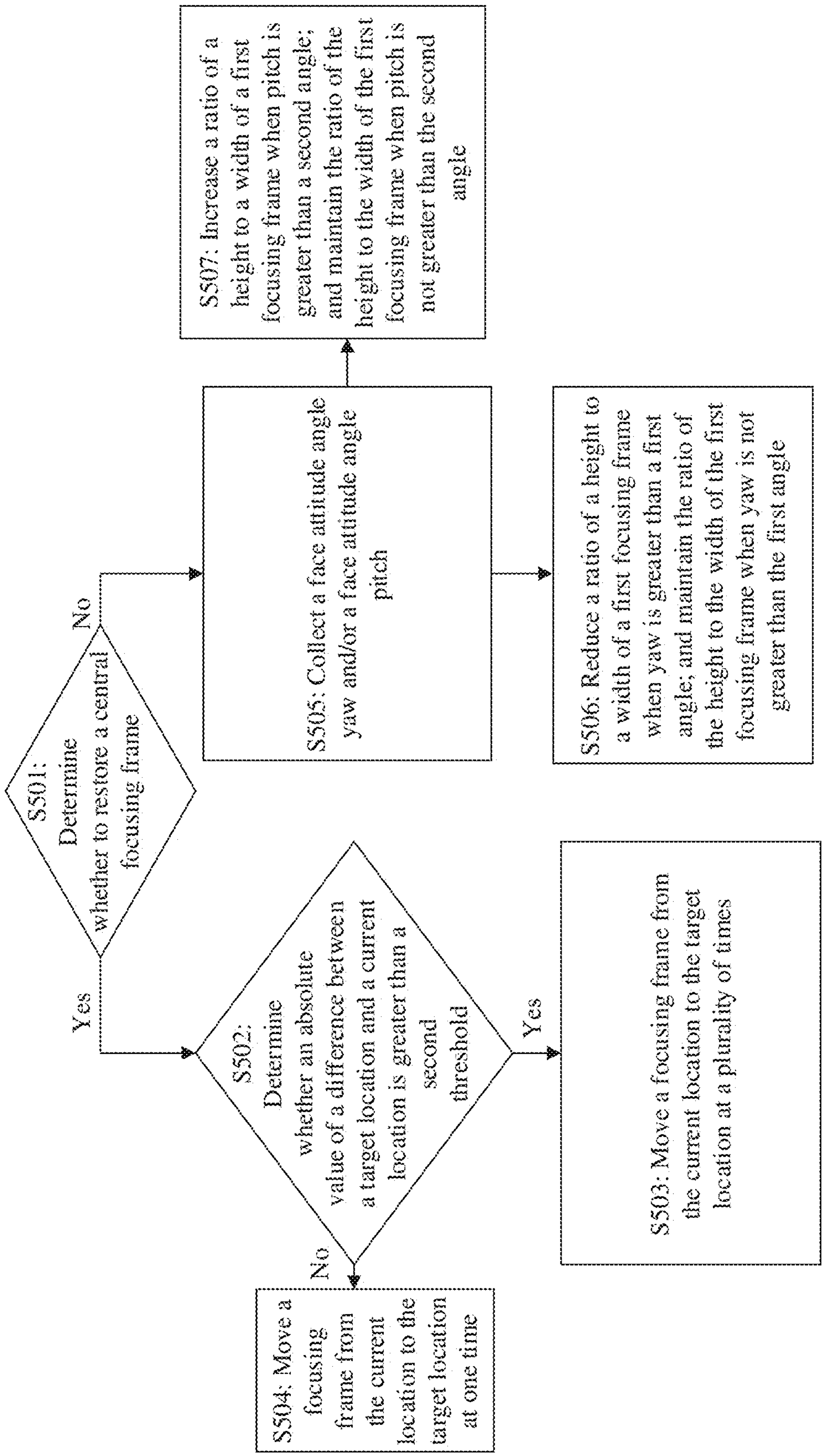
FIG. 20 is a schematic flowchart of still yet another focusing method according to an embodiment of this application.

FIG. 20 is a schematic flowchart of still yet another focusing method according to an embodiment of this application. As shown in FIG. 20, the focusing method includes steps S501 to S507.

In the focusing method provided in this embodiment of this application, whether an exit from face focusing is delayed may be identified based on a size and/or a location of a face focusing frame (first focusing frame). On one hand, when the exit from face focusing is made, a manner of exiting face focusing may be selected based on a current motor location and a central location of a focusing frame. When a distance between the current motor location and the central location of the focusing frame is greater than a specified threshold, the motor is pushed to the central location at a plurality of times; and when the distance between the current motor location and the central location of the focusing frame is not greater than the threshold, the motor is pushed to the central location for one time. On the other hand, when the exit from face focusing is not made, the size of the focusing frame may be adjusted based on a rotation situation of a head in the focusing frame.

S501: Determine whether a central focusing frame needs to be restored. Step S502 is performed if the central focusing frame needs to be restored; or step S505 is performed if central focusing frame does not need to be restored.

For descriptions in step S501, refer to related descriptions in steps S101 to S105 or steps S201 to S203. Details are not described.

S502: Determine whether an absolute value of a difference between a target location and a current location is greater than a second threshold. Step S503 is performed if the absolute value is greater than the second threshold; or step S504 is performed if the absolute value is not greater than the second threshold.

For descriptions in step S502, refer to related descriptions in step S401. Details are not described again.

S503: Move the focusing frame from the current location to the target location at a plurality of times.

The target location is a location of the central focusing frame. For descriptions in step S503, refer to related descriptions in step S402. Details are not described.

S504: Move the focusing frame from the current location to the target location at one time.

For descriptions in step S504, refer to related descriptions in step S403. Details are not described again.

S505: Collect a face attitude angle yaw and/or a face attitude angle pitch.

For descriptions in step S505, refer to related descriptions in step S301. Details are not described again.

S506: Reduce a ratio of a height to a width of the first focusing frame when yaw is greater than a first angle; and maintain the ratio of the height to the width of the first focusing frame when yaw is not greater than the first angle.

For descriptions in step S506, refer to related descriptions in step S302. Details are not described again.

S507: Reduce a ratio of a height to a width of the first focusing frame when pitch is greater than a second angle; and maintain the ratio of the height to the width of the first focusing frame when pitch is not greater than the second angle.

For descriptions in step S507, refer to related descriptions in step S303. Details are not described again.

In the foregoing embodiments, all or some functions may be implemented by software, hardware, or a combination of software and hardware. When software is used to implement embodiments, all or some of embodiments may be implemented in a form of a computer program product. The computer program product includes one or more computer program instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium. The computer-readable storage medium may be any usable medium that can be accessed by the computer, or a data storage device, for example, a server or a data center in which one or more usable mediums are integrated. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some procedures of the methods in embodiments may be implemented by a computer program instructing related hardware. The program may be stored in a computer-readable storage medium. When the program is executed, the procedures in the method embodiments may be performed. The storage medium includes any medium that can store program code, for example, a ROM, a random storage memory RAM, a magnetic disk, or a compact disc.

The invention claimed is:

1. A focusing method, the method comprising:

in response to a first operation, displaying a first preview image and a photographing control at a first time, wherein the first preview image comprises a face, an area of the first preview image where the face is located is displayed with a first target detection frame, the first target detection frame is used to indicate that a target detected at the first time is the face, and a ratio of a height to a width of the first target detection frame is a first ratio;

after the first time, displaying a second preview image and the photographing control at a second time, wherein the second preview image comprises the face, an area of the second preview image where the face is located is displayed with a second target detection frame, the second target detection frame is used to indicate that a target detected at the second time is the face, a ratio of a height to a width of the second target detection frame is a second ratio, and the second ratio is bigger than the first ratio; and after the second time, displaying a third preview image and the photographing control at a third time, wherein the third preview image comprises the face, an area of the third preview image where the face is located is displayed with a third target detection frame, the third target detection frame is used to indicate that a target detected at the third time is the face, and a ratio of a height to a width of the third target detection frame is a third ratio;

wherein the face in the first preview image has a first angle with the face in the second preview image, the face in the first preview image has a second angle with the face in the third preview image, and the first angle is increased to the second angle when the second ratio is increased to the third ratio; and in response to a second operation on the photographing control, the third preview image is saved.

2. The focusing method according to claim 1, the method further comprising:

after the third time, displaying a fourth preview image at a fourth time, wherein the fourth preview image does not comprise the face, and the fourth preview image comprises a fourth target detection frame.

3. The focusing method according to claim 2, wherein the fourth preview image does not comprise the face comprises:

the face is located at an edge of the fourth preview image.

4. The focusing method according to claim 1, the method further comprising:

after the third time, displaying a fifth preview image at a fifth time, wherein the fifth preview image does not comprise the face and any target detection frame.

5. The focusing method according to claim 1, wherein the height of the second target detection frame is approximately equal to the third target detection frame.

6. The focusing method according to claim 1, wherein the face in the first preview image has the first angle with the face in the second preview image, and the face in the first preview image has the second angle with the face in the third preview image comprises:

the face in the first preview image has the first angle with the face in the second preview image in a horizontal direction, and the face in the first preview image has the second angle with the face in the third preview image in the horizontal direction.

7. The focusing method according to claim 1, the method further comprising:

the first preview image comprises a front face, the second preview image comprises a side face and the third preview image comprises a side face.

8. The focusing method according to claim 1, the method further comprising:

detecting a face attitude angle, the face attitude angle of a front face is zero degrees, or the face attitude angle of a side face is not zero degrees.

9. The focusing method according to claim 8, wherein in the first preview image, a vertical downward direction is a Y-axis, a horizontal direction is an X-axis, and the face attitude angle is an angle of a head rotating along the Y-axis.

10. The focusing method according to claim 1, the method further comprising:

the width of the second target detection frame is smaller than the width of the first target detection frame, the width of the third target detection frame is smaller than the width of the second target detection frame, and the width is a length in a horizontal direction.

11. The focusing method according to claim 1, wherein the width of the second target detection frame is close to ¾ of the width of the first target detection frame.

12. The focusing method according to claim 1, wherein the first preview image is obtained by focusing on the first target detection frame, and the second preview image is obtained by focusing on the second target detection frame.

13. An electronic device, comprising a touchscreen, a camera, one or more processors, and one or more memories, wherein the one or more memories are configured to store computer program code, the computer program code comprises computer instructions, and when the one or more processors execute the computer instructions, the electronic device is enabled to perform the following operations:

in response to a first operation, displaying a first preview image and a photographing control at a first time, wherein the first preview image comprises a face, an area of the first preview image where the face is located is displayed with a first target detection frame, the first target detection frame is used to indicate that a target detected at the first time is the face, and a ratio of a height to a width of the first target detection frame is a first ratio;

after the first time, displaying a second preview image and the photographing control at a second time, wherein the second preview image comprises the face, an area of the second preview image where the face is located is displayed with a second target detection frame, the second target detection frame is used to indicate that a target detected at the second time is the face, a ratio of a height to a width of the second target detection frame is a second ratio, and the second ratio is bigger than the first ratio; and after the second time, displaying a third preview image and the photographing control at a third time, wherein the third preview image comprises the face, an area of the third preview image where the face is located is displayed with a third target detection frame, the third target detection frame is used to indicate that a target detected at the third time is the face, and a ratio of a height to a width of the third target detection frame is a third ratio;

wherein the face in the first preview image has a first angle with the face in the second preview image, the face in the first preview image has a second angle with the face in the third preview image, and the first angle is increased to the second angle when the second ratio is increased to the third ratio; and in response to a second operation on the photographing control, the third preview image is saved.

14. The electronic device according to claim 13, wherein the electronic device further performs the following operation:

after the third time, displaying a fourth preview image at a fourth time, wherein the fourth preview image does not comprise the face, and the fourth preview image comprises a fourth target detection frame.

15. The electronic device according to claim 13, wherein the electronic device further performs the following operation:

after the third time, displaying a fifth preview image at a fifth time, wherein the fifth preview image does not comprise the face and any target detection frame.

16. The electronic device according to claim 13, wherein the height of the second target detection frame is approximately equal to the third target detection frame.

17. The electronic device according to claim 13, wherein the face in the first preview image has the first angle with the face in the second preview image, and the face in the first preview image has the second angle with the face in the third preview image comprises:

the face in the first preview image has the first angle with the face in the second preview image in a horizontal direction, and the face in the first preview image has the second angle with the face in the third preview image in the horizontal direction.

18. The electronic device according to claim 13, wherein the electronic device further performs the following operation:

detecting a face attitude angle, the face attitude angle of a front face is zero degrees, or the face attitude angle of a side face is not zero degrees.

19. The electronic device according to claim 18, wherein in the first preview image, a vertical downward direction is a Y-axis, a horizontal direction is an X-axis, and the face attitude angle is an angle of a head rotating along the Y-axis.

20. The electronic device according to claim 13, wherein the first preview image is obtained by focusing on the first target detection frame, and the second preview image is obtained by focusing on the second target detection frame.

* * * * *